US012531663B2

United States Patent
Ouyang et al.

(10) Patent No.: US 12,531,663 B2
(45) Date of Patent: Jan. 20, 2026

(54) METHODS AND DEVICES FOR HIGH-QUALITY TRANSMISSION OF MEDIA DATA

(71) Applicant: Huawei Technologies Co., Ltd., Shenzhen (CN)

(72) Inventors: Xiaoyu Ouyang, Shenzhen (CN); Gengshi Wu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 427 days.

(21) Appl. No.: 18/154,544

(22) Filed: Jan. 13, 2023

(65) Prior Publication Data

US 2023/0188270 A1 Jun. 15, 2023

Related U.S. Application Data

(63) Continuation of application No. PCT/CN2020/101973, filed on Jul. 14, 2020.

(51) Int. Cl.
*H04W 72/04* (2023.01)
*H04L 1/1812* (2023.01)

(52) U.S. Cl.
CPC ................... *H04L 1/1819* (2013.01)

(58) Field of Classification Search
CPC ... H04L 1/1819; H04L 1/0041; H04L 1/0045; H04L 1/007; H04L 1/1845; H04L 1/18; H04L 1/1607

See application file for complete search history.

(56) References Cited

U.S. PATENT DOCUMENTS

| 8,483,235 | B2* | 7/2013 | Cheong | H04B 7/0413 |
| | | | | 370/480 |
| 11,894,929 | B2* | 2/2024 | Asterjadhi | H04L 5/0055 |
| 2008/0025206 | A1 | 1/2008 | Huang et al. | |
| 2012/0239998 | A1* | 9/2012 | Park | H04L 1/1896 |
| | | | | 714/748 |
| 2013/0070750 | A1* | 3/2013 | Kim | H04W 56/0085 |
| | | | | 370/350 |
| 2015/0295841 | A1* | 10/2015 | Neelisetty | H04L 47/41 |
| | | | | 370/328 |
| 2018/0270854 | A1* | 9/2018 | Lee | H04L 5/0044 |

(Continued)

FOREIGN PATENT DOCUMENTS

| CN | 107277423 A | * 10/2017 | ............. H04N 7/141 |
| CN | 109150876 A | 1/2019 | |
| JP | 2005260585 A | 9/2005 | |

*Primary Examiner* — Mahbubul Bar Chowdhury
(74) *Attorney, Agent, or Firm* — Slater Matsil, LLP

(57) ABSTRACT

Embodiments of this application provide a data transmission method, a transmit device, and a receive device. The method includes: sending important data of a media data frame to a receive device in a HARQ transmission mode; and after the important data of the media data frame is successfully sent, sending unimportant data of the media data frame to the receive device in a non-HARQ transmission mode. Based on this solution, data of the media data frame is classified into the important data and the unimportant data, and the unimportant data is sent after the important data is successfully sent. In this way, on one hand, the important data is preferentially sent, and successful sending of the important data can be ensured in the HARQ transmission mode.

20 Claims, 9 Drawing Sheets

(56) References Cited

U.S. PATENT DOCUMENTS

| | | | | |
|---|---|---|---|---|
| 2018/0279259 A1* | 9/2018 | Gulati | .................. | H04L 5/0071 |
| 2018/0295627 A1* | 10/2018 | Li | ......................... | H04W 72/53 |
| 2020/0099482 A1* | 3/2020 | Yu | ......................... | H04L 5/0055 |
| 2020/0322578 A1* | 10/2020 | Scalisi | ................ | G08B 13/248 |
| 2021/0194635 A1* | 6/2021 | Cedronius | ........... | H04L 43/0852 |

* cited by examiner

METHODS AND DEVICES FOR HIGH-QUALITY TRANSMISSION OF MEDIA DATA

CROSS-REFERENCE TO RELATED APPLICATIONS

This application is a continuation of International Application No. PCT/CN2020/101973, filed on Jul. 14, 2020, which is hereby incorporated by reference in its entirety.

TECHNICAL FIELD

Embodiments of this application relate to the field of communication technologies, and in particular, to a data transmission method, a transmit device, and a receive device.

BACKGROUND

With development of communication technologies, a user also expects to obtain better use experience. For example, when the user projects content on a small-screen device to a large-screen display device, the user expects to watch smooth and high-quality pictures. For another example, when listening to a music program online by using audio software, the user expects to hear a clear and smooth voice.

Therefore, how to implement high-quality transmission of media data to ensure better user experience needs to be resolved currently.

SUMMARY

Embodiments of this application provide a data transmission method, a transmit device, and a receive device, to implement high-quality transmission of media data to ensure better user experience.

According to a first aspect, an embodiment of this application provides a data transmission method, including: sending important data of a media data frame to a receive device in a HARQ transmission mode; and after the important data of the media data frame is successfully sent, sending unimportant data of the media data frame to the receive device in a non-HARQ transmission mode.

The important data refers to key information that can represent a media stream, and the unimportant data is data other than the important data. The important data of the media data frame includes a basic part of the media data frame and/or an encoding parameter corresponding to the media data frame, and the unimportant data of the media data frame includes an enhanced part of the media data frame. In an example, when the media data frame is an image, the important data of the media data frame may include contour information of the image, action information of a person, basic shape information of the image, and the like, and the unimportant data of the media data frame may include image color data, image detail data, and the like. It should be understood that, in an optional case, an entire I-frame in the media stream may be considered as the important data.

Based on the foregoing solution, data of the media data frame is classified into the important data and the unimportant data, and the unimportant data is sent after the important data is successfully sent. In this way, on one hand, the important data is preferentially sent, and successful sending of the important data can be ensured in the HARQ transmission mode. This improves data transmission quality. On the other hand, the unimportant data is transmitted in the non-HARQ transmission mode, which can reduce transmission overheads compared with the HARQ transmission mode.

In a possible implementation, a source end (for example, a data link layer or the like) of a transmit device obtains a to-be-transmitted media data frame, determines important data and unimportant data of the media data frame, and sends a first data packet and a second data packet to a channel end (for example, a physical layer) of the transmit device. The first data packet carries first indication information and the important data, and the first indication information indicates that the first data packet carries the important data. The second data packet carries second indication information and the unimportant data, and the second indication information indicates that the second data packet carries the unimportant data. Then, the channel end of the transmit device determines, based on the first indication information, that the to-be-transmitted data is the important data, and determines, based on the second indication information, that the to-be-transmitted data is the unimportant data. In an optional case, the first indication information and the second indication information may be carried in data. For example, the data carrying the first indication information is the important data, and the data carrying the second indication information is the unimportant data.

In a possible implementation, a source end (for example, a data link layer or the like) of a transmit device obtains a to-be-transmitted media data frame, determines important data of the media data frame, and sends a first data packet to a channel end (for example, a physical layer) of the transmit device. The first data packet carries first indication information and the important data, and the first indication information indicates that the first data packet carries the important data. When determining that the important data is successfully sent, the source end of the transmit device sends a second data packet to the channel end of the transmit device. The second data packet carries second indication information and unimportant data, and the second indication information indicates that the second data packet carries the unimportant data. Then, the channel end of the transmit device sends the unimportant data in the second data packet to the receive device based on the second indication information.

In a possible implementation, duration occupied for sending the important data of the media data frame does not exceed a length of a first sending time window, and the length of the first sending time window is maximum duration allowed for sending the important data of the media data frame and the unimportant data of the media data frame.

Time for sending each media data frame is limited in a manner of a sending time window, and each media data frame is sent only within the sending time window. When a media data frame fails to be sent within a corresponding sending time window, the media data frame is discarded, and a new media data frame continues to be transmitted in a next sending time window. This can avoid that normal transmission of a subsequent media data frame is affected because a media data frame fails to be sent, and improve transmission smoothness. For example, when the receive device is a display device, playing smoothness of the display device can be improved, and long-time frame freezing can be avoided.

In a possible implementation, the sending important data of a media data frame to a receive device in a HARQ transmission mode includes: sending the important data of the media data frame within the first sending time window in the HARQ transmission mode. After the important data of the media data frame is successfully sent, the sending unimportant data of the media data frame to the receive device in a non-HARQ transmission mode includes: after the important data of the media data frame is successfully sent, sending the unimportant data in remaining duration of the first sending time window, where the remaining duration is remaining time after the important data of the media data frame is successfully sent within the first sending time window.

Based on the method, successful transmission of the important data is preferentially ensured. This can improve data transmission quality and efficiency.

In a possible implementation, if the important data of the media data frame is successfully sent within the first sending time window, but remaining duration of the first sending time window is not enough for sending the unimportant data of the media data frame, sending of the unimportant data of the media data frame to the receive device is stopped, where the remaining duration is remaining time after the important data of the media data frame is successfully sent within the first sending time window.

In a possible implementation, if the important data of the media data frame is not successfully sent within the first sending time window, sending of the important data of the media data frame to the receive device is stopped, and sending of the unimportant data of the media data frame to the receive device is stopped.

The important data refers to the key information that can represent the media stream. Therefore, when the important data cannot be successfully sent, it is meaningless to send the unimportant data subsequently. Therefore, in the foregoing solution, when the important data fails to be successfully sent within the corresponding sending time window, sending of the important data is stopped. This avoids affecting timely transmission of another media data frame, and helps ensure transmission smoothness. At the same time, sending of the unimportant data of the media data frame is also stopped. This helps reduce resource overheads.

In a possible implementation, the non-HARQ transmission mode is a first transmission mode, and the first transmission mode is a transmission mode without a retransmission mechanism.

Because the unimportant data is less important, a requirement for transmission reliability is not particularly high. In the foregoing solution, the transmission mode without the retransmission mechanism is used for the unimportant data. This helps reduce resource overheads.

In a possible implementation, the non-HARQ transmission mode is a second transmission mode, and the second transmission mode is a transmission mode in which the retransmission mechanism exists and forward error correction FEC encoding version data corresponding to the unimportant data is retransmitted each time.

Because the unimportant data is less important, the requirement for the transmission reliability is not particularly high. In the foregoing solution, the transmission mode in which the retransmission mechanism exists and the FEC encoding version data corresponding to the unimportant data is retransmitted each time is used for the unimportant data. Reliability of the transmission mode is higher than reliability of the foregoing transmission mode without the retransmission mechanism, but is lower than reliability of the HARQ transmission mode corresponding to the important data. Based on this solution, transmission reliability is ensured to some extent, and resource overheads are reduced.

In a possible implementation, a maximum quantity of retransmissions corresponding to the second transmission mode is less than a maximum quantity of retransmissions corresponding to the HARQ transmission mode.

In a possible implementation, the sending important data of a media data frame to a receive device in a HARQ transmission mode includes: sending, to the receive device in the HARQ transmission mode, at least one first radio frame corresponding to the important data of the media data frame, where the at least one first radio frame carries a first sequence, and the first sequence indicates that the at least one first radio frame is sent in the HARQ transmission mode. The sending unimportant data of the media data frame to the receive device in a non-HARQ transmission mode includes: sending, to the receive device in the non-HARQ transmission mode, at least one second radio frame corresponding to the unimportant data, where the at least one second radio frame carries a second sequence, and the second sequence indicates that the at least one second radio frame is sent in the non-HARQ transmission mode. The first sequence and the second sequence are different sequences.

In a possible implementation, the first sequence and the second sequence are reverse sequences.

In a possible implementation, a frame format of the first radio frame is the same as a frame format of the second radio frame, and the frame format includes a long training field and a short training field. The long training field of the at least one first radio frame carries the first sequence, and the long training field of the second radio frame carries the second sequence; or the short training field of the at least one first radio frame carries the first sequence, and the short training field of the second radio frame carries the second sequence.

Based on the foregoing solution, changes to an existing frame format can be reduced by adding the first sequence or the second sequence to an existing field. The existing frame format includes the long training field and the short training field. The short training field is used to perform rough synchronization between two communication parties, and the long training field is used to perform precise synchronization between the two communication parties. The short training field is used as an example. In a conventional technology, the two communication parties agree to add the first sequence to the short training field in the existing frame format, and the transmit device adds the first sequence to the short training field. When the receive device can obtain the first sequence through correct parsing, rough synchronization can be implemented between the receive device and the transmit device. On this basis, the second sequence is added to the foregoing solution of this application. The second sequence is different from the first sequence. Optionally, the second sequence and the first sequence are reverse sequences. Therefore, the transmit device may add the first sequence or the second sequence to the short training field. When the receive device can obtain the first sequence or the second sequence through correct parsing, rough synchronization can be implemented between the receive device and the transmit device. In addition, the receive device may further determine, based on the first sequence or the second sequence, a transmission mode used to send a current radio frame: when the first sequence is obtained through correct parsing, it indicates that the current radio frame is sent in the HARQ transmission mode; and when the second sequence is obtained through correct parsing, it indicates that the current radio frame is sent in the non-HARQ transmission mode (for example, the pre-agreed first transmission mode or the pre-agreed second transmission mode). In another example, when the long training field is used to implement the foregoing functions of synchronization and a transmission mode indication, an implementation principle of the long training field is similar to an implementation principle of the short training field. Details are not described again.

In a possible implementation, the frame format is a non-HT format PPDU format or an HT mixed format.

In a possible implementation, the sending, to the receive device in the HARQ transmission mode, at least one first radio frame corresponding to the important data of the media data frame includes: storing a plurality of different redundancy encoding versions of the important data in a HARQ buffer, extracting any redundancy encoding version from the HARQ buffer, adding the redundancy encoding version to the first radio frame, and sending the first radio frame to the receive device.

In a possible implementation, the storing a plurality of different redundancy encoding versions of the important data in a HARQ buffer includes: performing turbo encoding on the important data to obtain the plurality of different redundancy encoding versions of the important data, and storing the plurality of different redundancy encoding versions in the HARQ buffer. The extracting any redundancy encoding version from the HARQ buffer, adding the redundancy encoding version to the first radio frame, and sending the first radio frame to the receive device includes: extracting a first redundancy encoding version in the plurality of different redundancy encoding versions from the HARQ buffer, adding the first redundancy encoding version to the first radio frame, and sending the first radio frame to the receive device; when a negative acknowledgment for the first radio frame is received from the receive device, extracting a second redundancy encoding version in the plurality of different redundancy encoding versions from the HARQ buffer, adding the second redundancy encoding version to another first radio frame, and sending the another first radio frame to the receive device; and when a positive acknowledgment for the first radio frame is received from the receive device or the maximum quantity of retransmissions is reached, stopping sending remaining redundancy encoding versions in the HARQ buffer to the receive device.

According to a second aspect, an embodiment of this application provides a data transmission method, including: receiving a radio frame from a transmit device; and if the radio frame carries a first sequence, decoding the radio frame in a decoding mode corresponding to a HARQ transmission mode, or if the radio frame carries a second sequence, decoding the radio frame in a decoding mode corresponding to a non-HARQ transmission mode. The second sequence is different from the first sequence.

Based on the foregoing solution, data is transmitted in different transmission modes. For example, important data may be transmitted in the HARQ transmission mode, and unimportant data may be transmitted in a non-HARQ transmission mode. In this way, successful sending of the important data can be ensured, and data transmission quality is improved. In addition, the unimportant data is transmitted in the non-HARQ transmission mode, which can reduce transmission overheads compared with the HARQ transmission mode. Further, the transmission mode of the radio frame is distinguished by adding the first sequence or the second sequence to the radio frame. Implementation is simple, and an existing frame format does not need to be changed. Therefore, practicability of the solution can be improved.

In a possible implementation, the decoding mode corresponding to the HARQ transmission mode is turbo decoding.

In a possible implementation, decoding the radio frame in the turbo decoding mode specifically includes: when it is determined that the radio frame carries initially transmitted data corresponding to first data, decoding the initially transmitted data carried in the radio frame; when decoding fails, storing the initially transmitted data in a HARQ buffer, where the HARQ buffer is used to store different redundancy encoding versions corresponding to the first data that is received from the transmit device and that fails to be decoded; and when it is determined that the radio frame carries retransmitted data corresponding to the first data, obtaining, from the HARQ buffer, different redundancy encoding versions corresponding to the first data, and performing joint decoding on the received retransmitted data and the different redundancy encoding versions corresponding to the first data obtained from the HARQ buffer.

In a possible implementation, after the retransmitted data is successfully decoded, the HARQ buffer is cleared.

In a possible implementation, the decoding mode corresponding to the non-HARQ transmission mode is FEC decoding.

In a possible implementation, the non-HARQ transmission mode is a first transmission mode, and the first transmission mode is a transmission mode without a retransmission mechanism.

Because the unimportant data is less important, a requirement for transmission reliability is not particularly high. In the foregoing solution, the transmission mode without the retransmission mechanism is used for the unimportant data. This helps reduce resource overheads.

In a possible implementation, the non-HARQ transmission mode is a second transmission mode, and the second transmission mode is a transmission mode in which the retransmission mechanism exists and FEC encoding version data corresponding to the unimportant data is retransmitted each time.

Because the unimportant data is less important, the requirement for the transmission reliability is not particularly high. In the foregoing solution, the transmission mode in which the retransmission mechanism exists and the FEC encoding version data corresponding to the unimportant data is retransmitted each time is used for the unimportant data. Reliability of the transmission mode is higher than reliability of the foregoing transmission mode without the retransmission mechanism, but is lower than reliability of the HARQ transmission mode corresponding to the important data. Based on this solution, transmission reliability is ensured to some extent, and resource overheads are reduced.

In a possible implementation, a maximum quantity of retransmissions corresponding to the second transmission mode is less than a maximum quantity of retransmissions corresponding to the HARQ transmission mode.

In a possible implementation, the first sequence and the second sequence are reverse sequences.

In a possible implementation, a frame format of the radio frame includes a long training field and a short training field. The long training field of the radio frame carries the first sequence or the second sequence; or the short training field of the radio frame carries the first sequence or the second sequence.

Based on the foregoing solution, changes to an existing frame format can be reduced by adding the first sequence or the second sequence to an existing field. The existing frame format includes the long training field and the short training field. The short training field is used to perform rough synchronization between two communication parties, and the long training field is used to perform precise synchronization and preliminary channel estimation between the two communication parties. The short training field is used as an example. In a conventional technology, the two communication parties agree to add the first sequence to the short training field in the existing frame format, and the transmit device adds the first sequence to the short training field. When a receive device can obtain the first sequence through correct parsing, rough synchronization can be implemented between the receive device and the transmit device. On this basis, the second sequence is added to the foregoing solution of this application. The second sequence is different from the first sequence. Optionally, the second sequence and the first sequence are reverse sequences. Therefore, the transmit device may add the first sequence or the second sequence to the short training field. When the receive device can obtain the first sequence or the second sequence through correct parsing, rough synchronization can be implemented between the receive device and the transmit device. In addition, the receive device may further determine: when the first sequence is obtained through correct parsing, it indicates that the current radio frame is sent in the HARQ transmission mode; and when the second sequence is obtained through correct parsing, it indicates that the current radio frame is sent in the non-HARQ transmission mode (for example, the pre-agreed first transmission mode or the pre-agreed second transmission mode). In another example, when the long training field is used to implement the foregoing functions of synchronization and a transmission mode indication, an implementation principle of the long training field is similar to an implementation principle of the short training field. Details are not described again.

In a possible implementation, the frame format is a non-HT format PPDU format or an HT mixed format.

In a possible implementation, feedback information for the radio frame is sent to the transmit device by using a pre-scheduled time-frequency resource, where the feedback information is a positive acknowledgment or a negative acknowledgment; feedback information is sent to the transmit device by using a first time-frequency resource, where the first time-frequency resource is a time-frequency resource occupied by the radio frame to be sent to the transmit device; or feedback information is sent to the transmit device by using a re-applied time-frequency resource.

In a possible implementation, the feedback information for the radio frame is sent to the transmit device by preferentially using the pre-scheduled time-frequency resource; if the pre-scheduled time-frequency resource cannot be used, the feedback information is sent to the transmit device by preferentially using the first time-frequency resource; or if neither the pre-scheduled time-frequency resource nor the first time-frequency resource can be used, the feedback information is sent to the transmit device by using the re-applied time-frequency resource.

Based on the method, a plurality of feedback information sending modes exist. When one of the modes cannot be used, another sending mode may be used. Therefore, a feedback information sending success rate can be ensured. In addition, because the pre-scheduled time-frequency resource is preferentially used, then the first time-frequency resource is used, and then the re-applied time-frequency resource is used, it can be ensured that the corresponding time-frequency resource can be timely obtained when the feedback information needs to be sent. This ensures quick sending of the feedback information, and helps improve transmission performance.

According to a third aspect, an embodiment of this application provides a transmit device. The transmit device has a function of implementing the first aspect or the implementations of the first aspect. The function may be implemented by hardware, or may be implemented by hardware executing corresponding software. The hardware or the software includes one or more modules corresponding to the function.

According to a fourth aspect, an embodiment of this application provides a receive device. The receive device has a function of implementing the second aspect or the implementations of the second aspect. The function may be implemented by hardware, or may be implemented by hardware executing corresponding software. The hardware or the software includes one or more modules corresponding to the function.

According to a fifth aspect, an embodiment of this application provides a transmit device, including a processor and a transmission interface. The processor is configured to invoke software instructions stored in a memory to perform the first aspect or any implementation of the first aspect.

According to a sixth aspect, an embodiment of this application provides a receive device, including a processor and a transmission interface. The processor is configured to invoke software instructions stored in a memory to perform the second aspect or any implementation of the second aspect.

According to a seventh aspect, an embodiment of this application provides a transmit device, including units or means configured to perform the steps of the first aspect or any implementation of the first aspect.

According to an eighth aspect, an embodiment of this application provides a receive device, including units or means configured to perform the steps of the second aspect or any implementation of the second aspect.

According to a ninth aspect, an embodiment of this application provides a transmit device, including a processor and an interface circuit. The processor is configured to: communicate with another device through the interface circuit, and perform the first aspect or any implementation of the first aspect. There are one or more processors.

According to a tenth aspect, an embodiment of this application provides a receive device, including a processor and an interface circuit. The processor is configured to: communicate with another device through the interface circuit, and perform the second aspect or any implementation of the second aspect. There are one or more processors.

According to an eleventh aspect, an embodiment of this application further provides a computer-readable storage medium, where the computer-readable storage medium includes a computer program. When the computer program runs on a computer or a processor, the computer or the processor is enabled to perform the first aspect, the second aspect, any implementation of the first aspect, or any implementation of the second aspect.

According to a twelfth aspect, an embodiment of this application further provides a computer program product, where the computer product includes a computer program. When the computer program runs on a computer or a processor, the computer or the processor is enabled to perform the first aspect, the second aspect, any implementation of the first aspect, or any implementation of the second aspect.

According to a thirteenth aspect, an embodiment of this application further provides a communication system, including a transmit device and a receive device. The transmit device is configured to: send important data of a media data frame to the receive device in a HARQ transmission mode, where the important data of the media data frame includes a basic part of the media data frame; and after the important data of the media data frame is successfully sent, send unimportant data of the media data frame to the receive device in a non-HARQ transmission mode, where the unimportant data of the media data frame includes an enhanced part of the media data frame. The receive device is configured to: receive a radio frame from the transmit device; and if the radio frame carries a first sequence, decode the radio frame in a decoding mode corresponding to the HARQ transmission mode, or if the radio frame carries a second sequence, decode the radio frame in a decoding mode corresponding to the non-HARQ transmission mode. The second sequence is different from the first sequence.

DETAILED DESCRIPTION OF ILLUSTRATIVE EMBODIMENTS

Figure 1A:
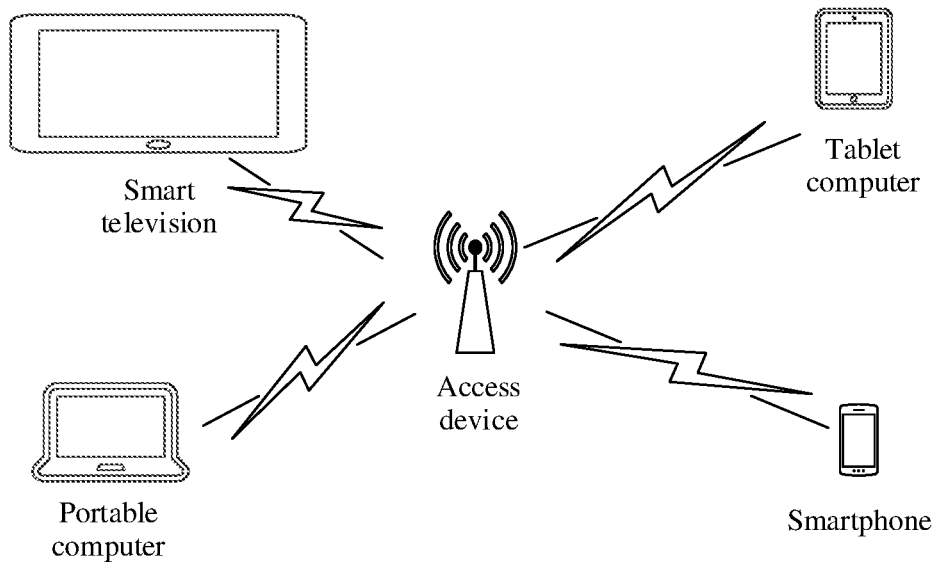
FIG. 1(a) is a schematic diagram of a network architecture to which an embodiment of this application is applicable.

FIG. 1(a) is a schematic diagram of a network architecture to which an embodiment of this application is applicable. The network architecture includes at least one terminal device and an access device. The terminal device communicates with the access device through a wireless interface.

The terminal device is a device having a wireless transceiver function. The terminal device may be deployed on land, including an indoor device, an outdoor device, a handheld device, or a vehicle-mounted device; may be deployed on water (for example, on a ship); or may be deployed in the air (for example, on a plane, a balloon, or a satellite). The terminal device may be a smartphone (mobile phone), a tablet computer (pad), a computer with a wireless transceiver function, a virtual reality (VR) terminal, an augmented reality (AR) terminal, a wireless terminal in industrial control, a wireless terminal in self driving, a wireless terminal in telemedicine (remote medical), a wireless terminal in a smart grid, a wireless terminal in transportation safety, a wireless terminal in a smart city, a wireless terminal device in a smart home, user equipment (UE), a smart television, a display screen, or the like.

The access device is a device that provides a wireless communication function for a terminal device. The access device includes but is not limited to a radio network controller (RNC), a home base station, a mobile switching center, a wireless fidelity (Wi-Fi) device, and the like.

A transmit device in this embodiment of this application is the terminal device in FIG. 1(a), and a receive device is another terminal device in FIG. 1(a). For example, when a user wants to project content on a small-screen device (for example, the smartphone) to a large-screen device (for example, the smart television or the display screen) for display, the smartphone may be the transmit device, and the smart television or the display screen may be the receive device.

This embodiment of this application may be applied to a plurality of application scenarios. For example, the user receives media data from an application server (that is, the transmit device) by using a display device (that is, the receive device), so that the user can watch a video, listen to audio, and the like. For another example, the user projects pictures of a small-screen device (that is, the transmit device) to a large-screen display device (that is, the receive device) for display.

The foregoing projection display application scenario is used as an example. As a smart large screen emerges, increasingly more consumers hope to project content on a small-screen device, such as a mobile phone, a portable computer, or a tablet computer, to a large screen by using a multi-screen interaction technology to obtain better viewing experience. Multi-screen interaction functions include the following three modes: (a) Content sharing mode: Multi-screen interaction is implemented by sharing media content or media content links between different devices; (b) Screen sharing mode: Multi-screen interaction is implemented by sharing a screen of a system or a screen in an application between different devices; and (c) Remote control mode: One device is used to control another device to implement multi-screen interaction.

The International Organization for Standardization and various industry alliances have defined a plurality of implementation solutions for the three multi-screen interaction modes. For example, one solution is a technical solution formulated by the Digital Living Network Alliance (DLNA). The solution is based on a universal plug and play (UPnP) protocol cluster, and the UPnP protocol cluster is based on open systems of protocols such as the transmission control protocol/Internet protocol (TCP/IP), the user datagram protocol (UDP), and the hypertext transfer protocol secure (HTTP). For another example, another solution is a Miracast multi-screen interaction technology. The technology is a Wi-Fi product certification project for the Wi-Fi display technology. The Wi-Fi Display is a standard formulated by the Wi-Fi Alliance. The technology is point-to-point (point to point, P2P) Wi-Fi transmission performed based on a medium access control (MAC) layer. A device that supports the standard may share video pictures in a wireless mode. For example, a mobile phone may directly play a film or a photo on a television or another apparatus by using Miracast without a link or a cable.

In the technologies described above, an underlying wireless transmission technology of the technologies uses a Wi-Fi technology, that is, Wi-Fi is used as an underlying link. In a multi-screen interaction scenario, a terminal device and a display device are required to perform synchronization in real time, and a bit rate requirement is very high. Therefore, how to improve image quality on the display screen needs to be urgently resolved currently.

Figure 1B:
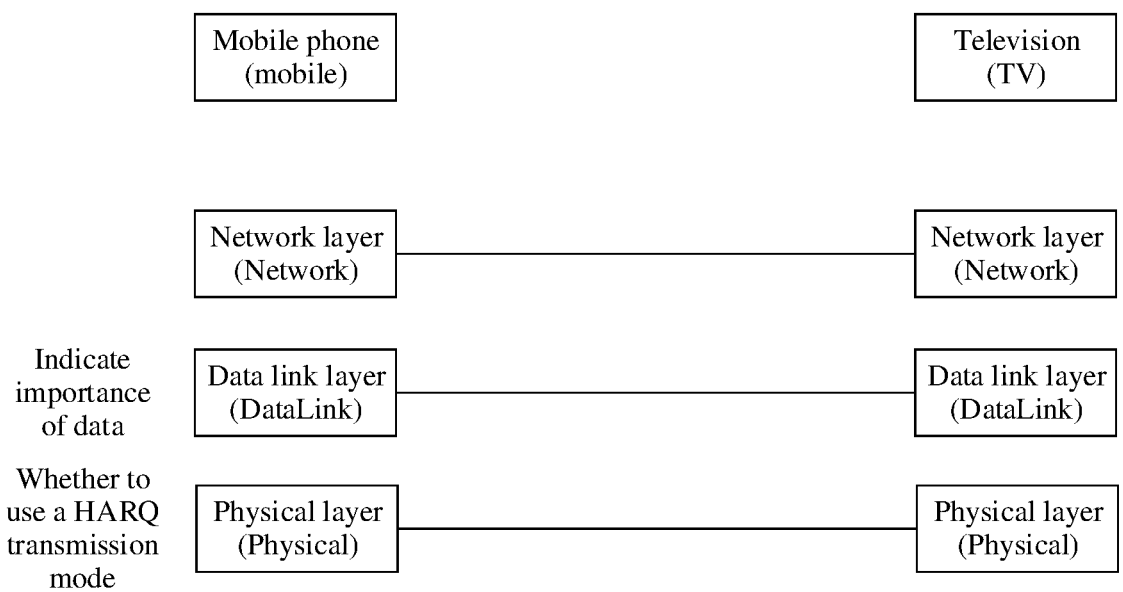
FIG. 1(b) is a schematic diagram of a structure of a protocol according to an embodiment of this application.

FIG. 1(b) is a schematic diagram of a structure of a protocol according to an embodiment of this application. When a terminal device (a mobile phone is used as an example) and a display device (a television is used as an example) perform multi-screen interaction, network transmission has a three-layer structure, including a network layer, a data link layer, and a physical layer. In this embodiment of this application, importance of data that needs to be transmitted may be indicated at the data link layer. If it is determined that the data is important data, the physical layer is indicated to transmit the data in a HARQ transmission mode to improve reliability and anti-interference performance of the data. If it is determined that the data is unimportant data, the physical layer is indicated to transmit the data in a non-HARQ transmission mode (for example, a first transmission mode or a second transmission mode).

Figure 1C:
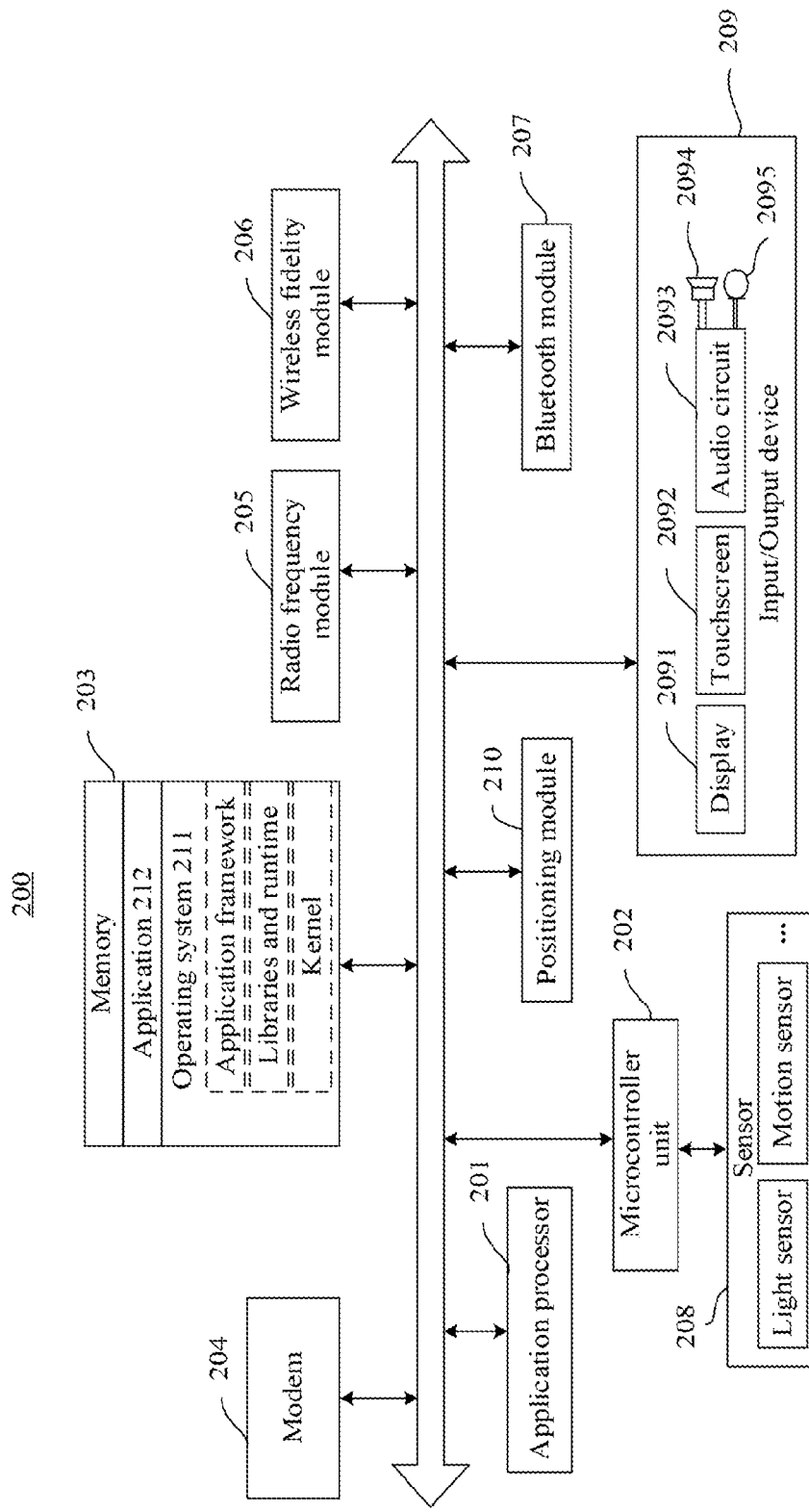
FIG. 1(c) is a schematic diagram of a structure of a device according to an embodiment of this application.

FIG. 1(c) is a schematic diagram of a structure of a device according to an embodiment of this application. The device 200 may be used as a transmit device, or may be used as a receive device. The device 200 includes components such as an application processor 201, a microcontroller unit (MCU) 202, a memory 203, a modem 204, a radio frequency (RF) module 205, a Wi-Fi module 206, a Bluetooth module 207, a sensor 208, an input/output (I/O) device 209, and a positioning module 210. These components can communicate with each other through one or more communication buses or signal cables. The communication bus or the signal cable may be a CAN bus provided in this application. A person skilled in the art may understand that, the device 200 may include more or fewer components than those shown in the diagram, some components may be combined, or the components may be disposed in a different manner.

The following describes the components of the device 200 in detail with reference to FIG. 1(c).

The application processor 201 is a control center of the device 200, and is connected to the components of the device 200 through various interfaces and buses. In some embodiments, the processor 201 may include one or more processing units.

The memory 203 stores computer programs such as an operating system 211 and an application 212 shown in FIG. 1(c). The application processor 201 is configured to execute the computer program in the memory 203 to implement a function defined by the computer program. For example, the application processor 201 executes the operating system 211 to implement various functions of the operating system on the device 200. The memory 203 further stores data other than the computer program, for example, data generated during running of the operating system 211 and the application 212. The memory 203 is a non-volatile storage medium, and usually includes an internal memory and an external memory. The internal memory includes but is not limited to a random access memory (RAM), a read-only memory (ROM), a cache, or the like. The external memory includes but is not limited to a flash memory, a hard disk, a compact disc, a universal serial bus (USB) flash drive, or the like. The computer program is usually stored in the external memory. Before executing the computer program, the processor loads the program from the external memory to the internal memory.

The memory 203 may be independent, and is connected to the application processor 201 through a bus. Alternatively, the memory 203 and the application processor 201 may be integrated into a chip subsystem.

The MCU 202 is a coprocessor configured to obtain and process data from the sensor 208. The MCU 202 has a weaker processing capability and lower power consumption than those of the application processor 201, but has a feature of "always on", and can continuously collect and process the sensor data when the application processor 201 is in a sleep mode, to ensure normal running of the sensor with extremely low power consumption. In an embodiment, the MCU 202 may be a sensor hub chip. The sensor 208 may include a light sensor and a motion sensor. Specifically, the light sensor may include an ambient light sensor and a proximity sensor. The ambient light sensor may adjust luminance of a display 2091 based on brightness of ambient light. The proximity sensor may power off the display screen when the device 200 approaches an ear. As one type of motion sensor, an accelerometer sensor may detect values of acceleration in various directions (generally three axes), and may detect a value and a direction of gravity when the accelerometer sensor is in a still state. The sensor 208 may further include another sensor, for example, a gyroscope, a barometer, a hygrometer, a thermometer, or an infrared sensor. Details are not described herein. The MCU 202 and the sensor 208 may be integrated into a same chip, or may be separate components connected through a bus.

The modem 204 and the radio frequency module 205 constitute a communication subsystem of the device 200, and are configured to implement main functions in a wireless communication standard protocol. The modem 204 is configured to perform encoding/decoding, signal modulation/demodulation, equalization, and the like. The radio frequency module 205 is configured to receive and send a radio signal. The radio frequency module 205 includes but is not limited to an antenna, at least one amplifier, a coupler, a duplexer, and the like. The radio frequency module 205 cooperates with the modem 204 to implement a wireless communication function. The modem 204 may serve as an independent chip, or may be combined with another chip or circuit to form a system-level chip or an integrated circuit. These chips or integrated circuits may be applied to all devices that implement wireless communication functions, including a mobile phone, a computer, a notebook computer, a tablet computer, a router, a wearable device, an automobile, a home appliance, and the like.

The device 200 may further perform wireless communication by using the Wi-Fi module 206, the Bluetooth module 207, or the like. The Wi-Fi module 206 is configured to provide, for the device 200, network access that complies with a Wi-Fi related standard protocol. The device 200 may access a Wi-Fi access point by using the Wi-Fi module 206 to access the Internet. In some other embodiments, the Wi-Fi module 206 may alternatively serve as a Wi-Fi wireless access point, and may provide Wi-Fi network access for another device. The Bluetooth module 207 is configured to implement short-range communication between the device 200 and another device (for example, a mobile phone, a smartwatch, or the like). The Wi-Fi module 206 in this embodiment of this application may be an integrated circuit, a Wi-Fi chip, or the like. The Bluetooth module 207 may be an integrated circuit, a Bluetooth chip, or the like.

The positioning module 210 is configured to determine a geographical location of the device 200. It may be understood that the positioning module 210 may be specifically a receiver of a positioning system, for example, a global positioning system (GPS), a BeiDou navigation satellite system, or a Russian GLONASS.

The Wi-Fi module 206, the Bluetooth module 207, and the positioning module 210 may be independent chips or integrated circuits, or may be integrated together. For example, in an embodiment, the Wi-Fi module 206, the Bluetooth module 207, and the positioning module 210 may be integrated into a same chip. In another embodiment, the Wi-Fi module 206, the Bluetooth module 207, the positioning module 210, and the MCU 202 may alternatively be integrated into a same chip.

The input/output device 209 includes but is not limited to the display 2091, a touchscreen 2092, an audio circuit 2093, and the like.

The touchscreen 2092 may collect a touch event of a user of the device 200 on or near the touchscreen 2092 (for example, an operation performed by the user on or near the touchscreen 2092 by using a finger or any suitable object, for example, a stylus), and sends the collected touch event to another component (for example, the application processor 201). The operation performed by the user near the touchscreen 2092 may be referred to as a floating touch. Through the floating touch, the user may select, move, or drag a target (for example, an icon) without directly touching the touchscreen 2092. In addition, the touchscreen 2092 may be implemented by using a plurality of types such as a resistive type, a capacitive type, an infrared type, and a surface acoustic wave type.

The display (also referred to as a display screen) 2091 is configured to display information entered by the user or information displayed to the user. The display 2091 may be configured in a form, for example, a liquid crystal display or an organic light-emitting diode. The touchscreen 2092 may cover the display 2091. After detecting a touch event, the touchscreen 2092 transmits the touch event to the application processor 201 to determine a type of the touch event. Then, the application processor 201 may provide corresponding visual output on the display 2091 based on the type of the touch event. In FIG. 1(c), the touchscreen 2092 and the display 2091 serve as two independent components to implement input and output functions of the device 200. However, in some embodiments, the touchscreen 2092 and the display 2091 may be integrated to implement the input and output functions of the device 200. In addition, the touchscreen 2092 and the display 2091 may be disposed on the front side of the device 200 in a full panel form to implement a bezel-less structure.

The audio circuit 2093, a speaker 2094, and a microphone 2095 may provide audio interfaces between the user and the device 200. The audio circuit 2093 may transmit, to the speaker 2094, an electrical signal into which received audio data is converted. The speaker 2094 converts the electrical signal into a sound signal for output. In addition, the microphone 2095 converts a collected sound signal into an electrical signal. The audio circuit 2093 receives the electrical signal, converts the electrical signal into audio data, and sends the audio data to another device by using the modem 204 and the radio frequency module 205, or outputs the audio data to the memory 203 for further processing.

In addition, the device 200 may further have a fingerprint recognition function. For example, a fingerprint collection component may be configured on the back side of the device 200 (for example, the lower part of a rear-facing camera), or a fingerprint collection component may be configured on the front side of the device 200 (for example, the lower part of the touchscreen 2092). For another example, a fingerprint collection component may be configured in the touchscreen 2092 to implement the fingerprint recognition function. To be specific, the fingerprint collection component may be integrated with the touchscreen 2092 to implement the fingerprint recognition function of the device 200. In this case, the fingerprint collection component is configured in the touchscreen 2092, and may be a part of the touchscreen 2092 or may be configured in the touchscreen 2092 in another manner. A main part of the fingerprint collection component in this embodiment of this application is a fingerprint sensor. The fingerprint sensor may use any type of sensing technology, including but not limited to an optical sensing technology, a capacitive sensing technology, a piezoelectric sensing technology, an ultrasonic wave sensing technology, or the like.

Further, the operating system 211 carried in the device 200 may be iOS®, Android®, Microsoft®, or another operating system. This is not limited in this embodiment of this application.

The device 200 carrying the Android® operating system is used as an example. The device 200 may be logically divided into a hardware layer, the operating system 211, and an application layer. The hardware layer includes hardware resources such as the foregoing application processor 201, MCU 202, memory 203, modem 204, Wi-Fi module 206, sensor 208, and positioning module 210. The application layer includes one or more applications, for example, the application 212. The application 212 may be an application of any type, for example, a social application, an e-commerce application, a browser, or the like. The operating system 211 serves as software middleware between the hardware layer and the application layer, and is a computer program for managing and controlling hardware and software resources.

In an embodiment, the operating system 211 includes a kernel, a hardware abstraction layer (HAL), libraries and runtime, and a framework. The kernel is configured to provide an underlying system component and service, for example, power management, memory management, thread management, and a hardware driver. The hardware driver includes a Wi-Fi driver, a sensor driver, a positioning module driver, and the like. The hardware abstraction layer encapsulates a kernel driver program, provides an interface for the framework, and shields an underlying implementation detail. The hardware abstraction layer is run in user space, and the kernel driver program runs in kernel space.

The libraries and runtime is also referred to as a runtime library, and provides a library file and an execution environment that are required when an executable program runs. In an embodiment, the libraries and runtime include Android runtime (ART), a library, and a scenario package runtime. The ART is a virtual machine or a virtual machine instance that can convert bytecode of an application into machine code. The library is a program library that provides support for the executable program during running, and includes a browser engine (for example, a webkit), a script execution engine (for example, a JavaScript engine), a graphics processing engine, and the like. The scenario package runtime is a running environment of a scenario package, and mainly includes a page execution environment (page context) and a script execution environment (script context). The page execution environment invokes a corresponding library to parse page code in an HTML, CSS, or another format, and the script execution environment invokes a corresponding function library to parse and execute code or an executable file implemented by a script language such as JavaScript.

The framework is configured to provide various basic common components and services such as window management and location management for the application at the application layer. In an embodiment, the framework includes a geofence service, a policy service, a notification manager, and the like.

All functions of the components in the operating system 211 described above may be implemented by the application processor 201 by executing the program stored in the memory 203.

A person skilled in the art may understand that the device 200 may include fewer or more components than those shown in FIG. 1(c), and the device shown in FIG. 1(c) includes only components more related to a plurality of implementations disclosed in this application.

Figure 1D:
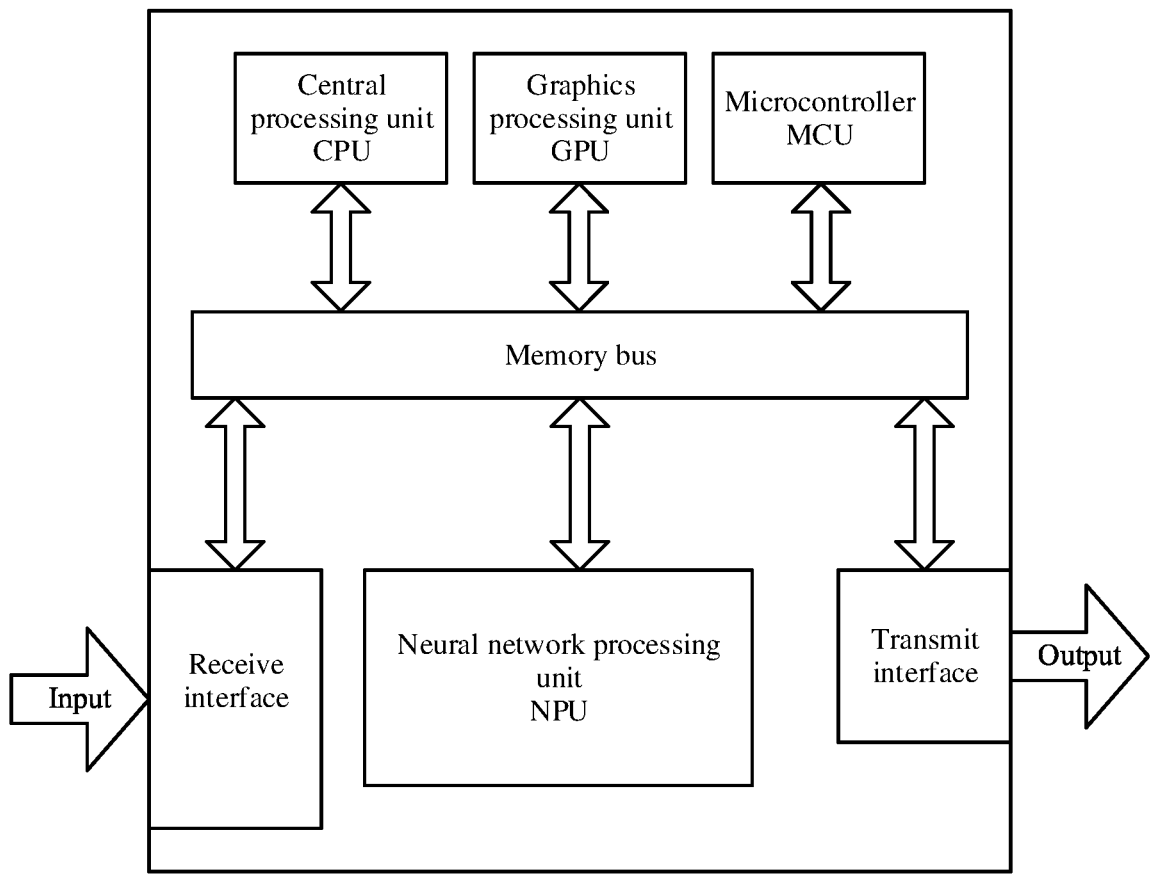
FIG. 1(d) is an example diagram of a hardware architecture of a data transmission apparatus according to an embodiment of this application.

FIG. 1(d) is an example diagram of a hardware architecture of a data transmission apparatus according to an embodiment of this application. The data transmission apparatus 300 may be used for a transmit device or a receive device. The data transmission apparatus 300 may be, for example, a processor chip. The apparatus 300 includes at least one CPU, a memory, a microcontroller (Microcontroller Unit, MCU), GPU, an NPU, a memory bus, a receive interface, a transmit interface, and the like. Although not shown in FIG. 1(d), the apparatus 300 may further include an application processor (AP), a decoder, and a dedicated video/image processor.

The foregoing parts of the apparatus 300 are coupled by using a connector. For example, the connector includes various types of interfaces, transmission cables, buses, or the like. These interfaces are usually electrical communication interfaces, but may also be mechanical interfaces or interfaces in other forms. This is not limited in this embodiment.

Optionally, the CPU may be a single-core processor (single-CPU) or a multi-core processor (multi-CPU). Optionally, the CPU may be a processor group including a plurality of processors, and the plurality of processors are coupled to each other through one or more buses. The receive interface may be a data input interface of the processor chip. In an optional case, the receive interface and the transmit interface may be high-definition multimedia interfaces (High Definition Multimedia Interface, HDMI), V-by-One interfaces, embedded DisplayPorts (Embedded Display Port, eDP), mobile industry processor interfaces (MIPI), DisplayPorts (DP), or the like.

In an optional case, the foregoing parts are integrated into a same chip. In another optional case, the CPU, the GPU, the decoder, the receive interface, and the transmit interface are integrated into a chip, and parts in the chip access an external memory through a bus. The dedicated video/graphics processor may be integrated with the CPU on a same chip, or may exist as a separate processor chip. For example, the dedicated video/graphics processor may be a dedicated ISP. In an optional case, the NPU may alternatively be used as an independent processor chip. The NPU is configured to implement related operations of various neural networks or deep learning.

The chip in this embodiment of this application is a system manufactured on a same semiconductor substrate by using an integrated circuit technology, and is also referred to as a semiconductor chip. The chip may be a set of integrated circuits formed on the substrate (which is usually a semiconductor material such as silicon) by using the integrated circuit technology, and an outer layer of the chip is usually packaged with a semiconductor packaging material. The integrated circuit may include various functional components. Each type of functional component includes a logic gate circuit, a metal oxide semiconductor (Metal-Oxide-Semiconductor, MOS) transistor, or a transistor such as a bipolar transistor or a diode, and may also include another part such as a capacitor, a resistor, or an inductor. Each functional component may independently operate or operate under action of necessary driver software, and may implement various functions such as communication, operation, or storage.

Figure 2:
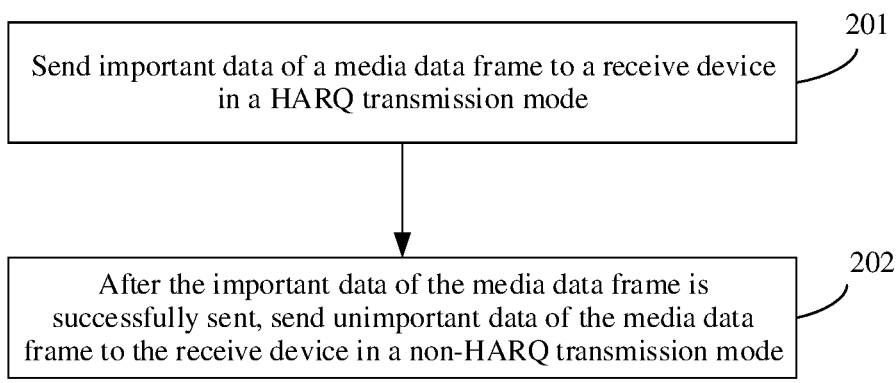
FIG. 2 is a schematic diagram of a data transmission method according to an embodiment of this application.

To implement high-quality transmission of media data between a transmit device (for example, the foregoing terminal device) and a receive device (for example, the foregoing display device), as shown in FIG. 2, an embodiment of this application provides a data transmission method. The method is performed by a transmit side, for example, may be performed by a transmit device or a chip used for the transmit device.

The method includes the following steps.

Step 201: Send important data of a media data frame to a receive device in a hybrid automatic repeat request (HARQ) transmission mode.

Step 202: After the important data of the media data frame is successfully sent, send unimportant data of the media data frame to the receive device in a non-HARQ transmission mode.

The important data of the media data frame includes a basic part of the media data frame and/or an encoding parameter corresponding to the media data frame. The unimportant data of the media data frame includes an enhanced part of the media data frame. The media data frame may be an image, a section of audio, or the like. For example, when the media data frame is the image, the important data of the media data frame may include contour information of the image, action information of a person, basic shape information of the image, the encoding parameter corresponding to the media data frame, and the like, and the unimportant data of the media data frame may include image color data, image detail data, and the like. It should be understood that, in an optional case, an entire I-frame in a media stream may be considered as the important data. The I-frame indicates a key frame. The I-frame may also be referred to as an intra picture or an intra-frame encoding frame, and is an independent frame carrying all information. The I-frame can be encoded independently without referring to another picture. During decoding, a complete picture can be reconstructed by using only data of the I-frame.

Based on the foregoing solution, data of the media data frame is classified into the important data and the unimportant data, and the unimportant data is sent after the important data is successfully sent. In this way, on one hand, the important data is preferentially sent, and successful sending of the important data can be ensured in the HARQ transmission mode. This improves data transmission quality. On the other hand, the unimportant data is transmitted in the non-HARQ transmission mode, which can reduce transmission overheads compared with the HARQ transmission mode.

In an implementation, in this embodiment of this application, maximum duration for sending a media data frame may be preconfigured. Therefore, each media data frame corresponds to one sending time window, and the media data frame may be sent within the sending time window. If the sending time window is exceeded, the media data frame is no longer sent. A length of the sending time window is the maximum duration allowed for sending the important data of the media data frame and the unimportant data of the media data frame. Duration occupied for sending the important data of the media data frame does not exceed the length of the sending time window. To preferentially ensure successful sending of the important data of the media data frame, maximum sending duration of the important data may be equal to the length of the sending time window. Duration of sending time windows corresponding to media data frames may be the same or may be different.

For example, if a current to-be-sent media data frame is sent in a first sending time window, step 201 may be specifically: sending the important data of the media data frame within the first sending time window in the HARQ transmission mode. The foregoing step 202 may be specifically: after the important data of the media data frame is successfully sent, sending the unimportant data in remaining duration of the first sending time window, where the remaining duration is remaining time after the important data of the media data frame is successfully sent within the first sending time window.

Optionally, if the important data of the media data frame is not successfully sent within the first sending time window, sending of the important data of the media data frame to the receive device is stopped, and sending of the unimportant data of the media data frame to the receive device is stopped. That is, the media data frame fails to be sent. Because the important data of the media data frame cannot be successfully sent, it is unnecessary to send the unimportant data of the media data frame. This can reduce resources.

Optionally, if the important data of the media data frame is successfully sent within the first sending time window, but remaining duration of the first sending time window is not enough for sending the unimportant data of the media data frame, sending of the unimportant data of the media data frame to the receive device is stopped. That is, after the important data is preferentially ensured successfully, if the duration of the first sending time window is not enough for sending the unimportant data, the unimportant data is not sent. Based on the method, although not all data of the media data frame is sent to the receive device, sending of the important data of the media data frame is at least ensured. Therefore, data transmission quality can also be improved, and user experience is improved.

Figure 3:
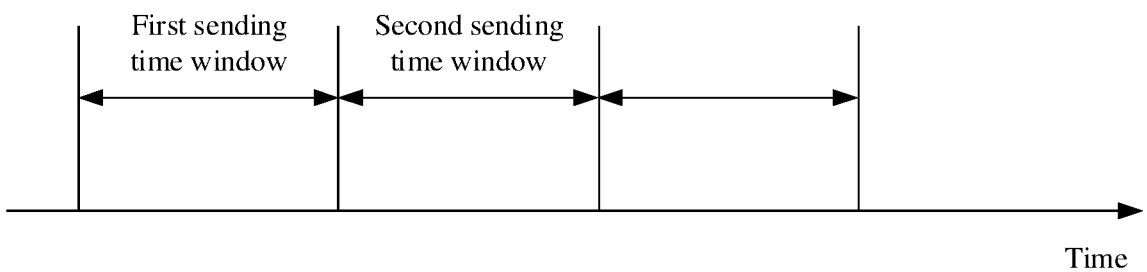
FIG. 3 is a schematic diagram of a sending time window.

FIG. 3 is a schematic diagram of a sending time window. It is assumed that a length of the first sending time window is 10 milliseconds (ms) (calculated from $0^{th}$ ms). One data transmission occupies 3 ms, and the one data transmission includes sending data and receiving feedback information (which may be a positive acknowledgment (ACK) or a negative acknowledgment (NACK)) for the data from the receive device. A maximum quantity of retransmissions of a HARQ retransmission of the important data is preset to 3.

For example, if the positive acknowledgment is received after the important data is sent for the first time at $0^{th}$ ms, it indicates that the important data is successfully decoded by the receive device. In this case, the transmit device starts to send the unimportant data from $3^{rd}$ ms of the first sending time window.

For another example, if the negative acknowledgment is received after the important data is sent for the first time at $0^{th}$ ms, it indicates that the important data is not successfully decoded by the receive device. In this case, the transmit device continues to send the important data from $3^{rd}$ ms of the first sending time window, that is, performs the HARQ retransmission. If the positive acknowledgment is received after the important data is sent for the second time, it indicates that the important data is successfully decoded by the receive device. In this case, the transmit device starts to send the unimportant data from $6^{th}$ ms of the first sending time window.

For another example, if the negative acknowledgment is received after the important data is sent for the first time at $0^{th}$ ms, it indicates that the important data is not successfully decoded by the receive device. In this case, the transmit device continues to send the important data from $3^{rd}$ ms of the first sending time window, that is, performs the HARQ retransmission. If the negative acknowledgment is received after the important data is sent for the second time, it indicates that the important data is not successfully decoded by the receive device. In this case, the transmit device continues to send the important data from $6^{th}$ ms of the first sending time window. If the positive acknowledgment is received after the important data is sent for the third time, it indicates that the important data is successfully decoded by the receive device, that is, the important data is successfully sent, but remaining duration (that is, 1 ms) is not enough for sending the unimportant data. Therefore, the unimportant data is not sent. If the negative acknowledgment is received after the important data is sent for the third time, it indicates that the important data is not successfully decoded by the receive device, that is, the important data fails to be sent. Because the important data fails to be sent, the unimportant data is not sent.

For example, a source end (for example, a data link layer) of the transmit device obtains a to-be-transmitted media data frame, and then classifies the media data frame into important data and unimportant data. For the important data, when sending a data packet carrying the important data to a channel end (for example, a physical layer), the source end further adds first indication information to the data packet. The first indication information indicates that the data packet carries the important data. Therefore, the channel end sends the important data to the receive device in the HARQ transmission mode. For the unimportant data, when sending a data packet carrying the unimportant data to a channel end (for example, a physical layer), the source end further adds second indication information to the data packet. The second indication information indicates that the data packet carries the unimportant data. Therefore, the channel end sends the unimportant data to the receive device in the non-HARQ transmission mode. The first indication information and the second indication information are different.

The following describes the HARQ transmission mode and the non-HARQ transmission mode in the foregoing embodiments.

1. HARQ Transmission Mode

The channel end of the transmit device may send, based on a current resource scheduling status, the important data of the to-be-transmitted media data frame to the receive device by using one or more first radio frames.

For example, if the important data of the to-be-transmitted media data frame is 1200 bytes, and a currently scheduled radio time-frequency resource may be used to transmit 200-byte data, the channel end of the transmit device may perform channel encoding (for example, perform turbo encoding) on first 200 bytes of the important data to obtain N different redundancy encoding versions of the 200-byte data, and store the plurality of different redundancy encoding versions in a HARQ buffer. N is a quantity of redundancy encoding versions, and N is a positive integer.

Subsequently, after the 200-byte data is successfully transmitted or the 200-byte data is still not successfully transmitted when the maximum quantity of retransmissions is reached, the channel end of the transmit device may clear the HARQ buffer, and continue to transmit another part of the important data based on the currently scheduled radio time-frequency resource. For example, if the currently scheduled radio time-frequency resource may be used to transmit 400-byte data, the channel end of the transmit device may perform channel encoding (for example, perform turbo encoding) on $201^{st}$ to $600^{th}$ bytes (400 bytes in total) of the important data to obtain N different redundancy encoding versions, and store the plurality of different redundancy encoding versions in the HARQ buffer.

In this way, one data frame may be encapsulated into one first radio frame through one time of resource scheduling, and the first radio frame is sent to the receive device. Alternatively, one data frame is encapsulated into a plurality of first radio frames through a plurality of times of resource scheduling, and the plurality of first radio frames are sent to the receive device in a plurality of times.

Figure 4:
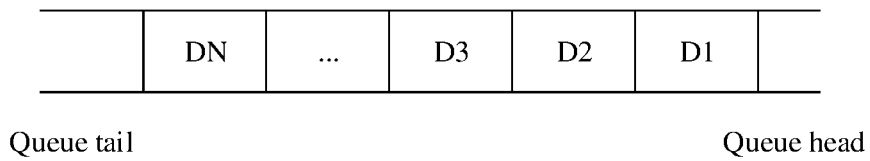
FIG. 4 is a schematic diagram of a HARQ buffer of a transmit device.

The following uses the foregoing 200-byte data as an example to describe a specific process of sending in the HARQ transmission mode. FIG. 4 is a schematic diagram of a HARQ buffer. An example in which the HARQ buffer is implemented in a queue manner is used. N different redundancy encoding versions (which are respectively D1, D2, . . . , and DN) are obtained by performing turbo encoding on the 200-byte data, and are stored in the HARQ buffer. When the 200-byte data needs to be sent, the channel end of the transmit device extracts D1 from the HARQ buffer, encapsulates D1 into a first radio frame, and sends the first radio frame to the receive device. If a positive acknowledgment for the first radio frame is received from the receive device, it indicates that the receive device successfully decodes D1, and the 200-byte data is successfully sent. If a negative acknowledgment for the first radio frame is received from the receive device, it indicates that the receive device fails to decode D1, the channel end of the transmit device extracts D2 from the HARQ buffer, encapsulates D2 into a first radio frame, and sends the first radio frame to the receive device. The rest may be deduced by analogy. After a positive acknowledgment for the first radio frame is received from the receive device, it indicates that the 200 bytes are successfully sent. If no positive acknowledgment is received after all the N redundancy encoding versions are sent, it indicates that the 200 bytes fail to be sent.

After the 200 bytes are successfully sent, the HARQ buffer of the transmit device needs to be cleared, so that the HARQ buffer may be used to send another byte of data in the important data.

2. Non-HARQ Transmission Mode

In an example, this embodiment of this application provides specific implementations of two non-HARQ transmission modes.

In an implementation, the non-HARQ transmission mode is a first transmission mode, and the first transmission mode is a transmission mode without a retransmission mechanism. For example, for the unimportant data of the to-be-transmitted media data frame, because the unimportant data is large and needs to be encapsulated into a plurality of second radio frames through a plurality of times of resource scheduling for sending, each second radio frame corresponding to the unimportant data is sent for only one time. Compared with the foregoing HARQ retransmission mode, this mode occupies fewer time-frequency resources. However, data transmission reliability of this mode is lower than data transmission reliability of the HARQ retransmission mode.

In another implementation, the non-HARQ transmission mode is a second transmission mode, and the second transmission mode is a transmission mode in which the retransmission mechanism exists and forward error correction (FEC) encoding version data corresponding to the unimportant data is retransmitted each time. Both the second transmission mode and the foregoing HARQ transmission mode are transmission modes having the retransmission mechanism. However, a biggest difference is that in the second transmission mode, for data that needs to be transmitted, an encoding version of the data is the same during each transmission (including an initial transmission and a retransmission), that is, FEC encoding is used; and in the foregoing HARQ transmission mode, for data that needs to be transmitted, an encoding version of the data is a different redundancy encoding version during each transmission (including an initial transmission and a retransmission). In the second transmission mode, because an encoding version of retransmitted data received by the receive device each time is the same, joint decoding cannot be implemented during decoding. Therefore, compared with the HARQ transmission mode, there is no decoding gain. However, advantages of the second transmission mode are as follows: For a retransmitted frame that carries the retransmitted data, in the second transmission mode, only the retransmitted data needs to be decoded, and there is no need performing joint decoding based on the newly received retransmitted data and data that fails to be decoded previously and that is obtained from the HARQ buffer in a decoding mode corresponding to the HARQ transmission mode; and therefore single decoding of a decoding mode corresponding to the second transmission mode is faster than single decoding of the decoding mode corresponding to the HARQ transmission mode. Optionally, a maximum quantity of retransmissions corresponding to the second transmission mode is less than a maximum quantity of retransmissions corresponding to the HARQ transmission mode.

The foregoing compares the HARQ transmission mode and the non-HARQ transmission mode.

In an implementation, to enable the receive device to identify whether a received radio frame (for example, the first radio frame or the second radio frame) carries the important data or the unimportant data, or to enable the receive device to identify whether a received radio frame (for example, the first radio frame or the second radio frame) uses the HARQ transmission mode or the non-HARQ transmission mode, for example, the channel end of the transmit device may add a first sequence to the first radio frame, and add a second sequence to the second radio frame. The first sequence and the second sequence are different sequences. Optionally, the first sequence and the second sequence are reverse sequences. Therefore, after the receive device receives a radio frame from the transmit device, if determining that the radio frame carries the first sequence, the receive device determines that the radio frame carries the important data, or determines that the radio frame is transmitted in the HARQ transmission mode; and if determining that the radio frame carries the second sequence, the receive device determines that the radio frame carries the unimportant data, or determines that the radio frame is transmitted in the non-HARQ transmission mode (which may be preconfigured as the first transmission mode or the second transmission mode).

The first sequence indicates that the first radio frame is sent in the HARQ transmission mode, or indicates that the first radio frame carries the important data. The second sequence indicates that the second radio frame is sent in the non-HARQ transmission mode, or indicates that the second radio frame carries the unimportant data.

In an example, a frame format of the first radio frame is the same as a frame format of the second radio frame, and the frame format includes a long training field and a short training field. For example, the frame format is a non-high throughput format (non-HT format) physical layer protocol data unit (PPDU) format or a high throughput mixed format (HT mixed format).

In an implementation, the long training field of the first radio frame carries the first sequence, and the long training field of the second radio frame carries the second sequence. Therefore, when the receive device receives a radio frame, if a long training field of the radio frame carries the first sequence, the receive device determines that the radio frame carries the important data, or determines that the radio frame is transmitted in the HARQ transmission mode; or if a long training field of the radio frame carries the second sequence, the receive device determines that the radio frame carries the unimportant data, or determines that the radio frame is transmitted in the non-HARQ transmission mode.

In another implementation, the short training field of the first radio frame carries the first sequence, and the short training field of the second radio frame carries the second sequence. Therefore, when the receive device receives a radio frame, if a short training field of the radio frame carries the first sequence, the receive device determines that the radio frame carries the important data, or determines that the radio frame is transmitted in the HARQ transmission mode; or if a short training field of the radio frame carries the second sequence, the receive device determines that the radio frame carries the unimportant data, or determines that the radio frame is transmitted in the non-HARQ transmission mode.

Figure 5:
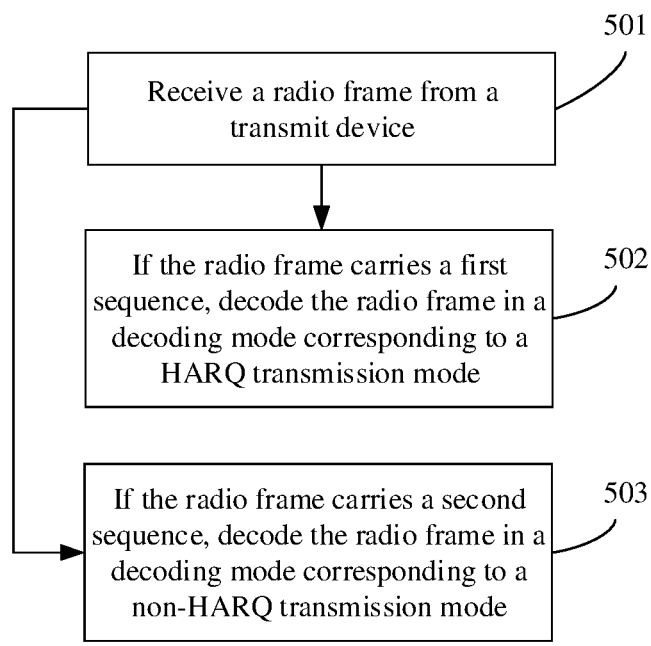
FIG. 5 is a schematic diagram of another data transmission method according to an embodiment of this application.

To implement high-quality transmission of media data between a transmit device and a receive device, as shown in FIG. 5, an embodiment of this application provides a data transmission method. The method is performed by a receive side, for example, may be performed by a receive device or a chip used for the receive device. It should be noted that the method embodiments on the receive side may be implemented in combination with the foregoing method embodiments on the transmit side.

The method includes the following steps.

Step 501: Receive a radio frame from a transmit device.

Specifically, a channel end (that is, a physical layer) of the receive device may receive the radio frame from the transmit device. The received radio frame may be the first radio frame that is described in the embodiment in FIG. 2 and that is sent in the HARQ transmission mode, or may be the second radio frame that is described in the embodiment in FIG. 2 and that is sent in the non-HARQ transmission mode (that is, the preconfigured first transmission mode or the preconfigured second transmission mode).

The radio frame carries a first sequence or a second sequence. If the radio frame carries the first sequence, the following step 502 is performed. If the radio frame carries the second sequence, the following step 503 is performed.

For example, a specific manner in which the radio frame carries the first sequence or the second sequence may be, for example, that the radio frame includes a random access preamble. The random access preamble carries the first sequence or the second sequence. For a Wi-Fi radio frame, the random access preamble includes a long training field and a short training field. Therefore, when the radio frame carries the first sequence, it may be specifically that the first sequence is carried in the long training field (or the short training field). When the radio frame carries the second sequence, it may be specifically that the second sequence is carried in the long training field (or the short training field). The first sequence and the second sequence are different. Optionally, the first sequence and the second sequence are reverse sequences.

The following describes formats of the first radio frame and the second radio frame with reference to a specific example. The first radio frame and the second radio frame may be Wi-Fi radio frames.

Figure 6A:
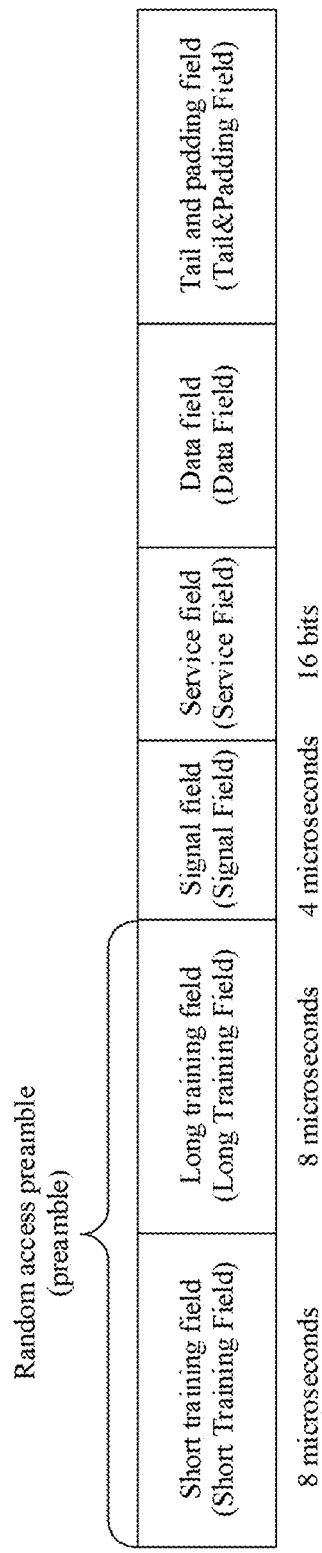
FIG. 6(a) is a schematic diagram of a format of a Wi-Fi radio frame.

FIG. 6(a) is a schematic diagram of a format of a Wi-Fi radio frame. The Wi-Fi radio frame is a non-HT format PPDU. Meanings of fields in the non-HT format PPDU are shown in Table 1.

TABLE 1

| PPDU field | English description | Function description |
| --- | --- | --- |
| Short training field (STF) | Short training field | Used for rough synchronization between two communication parties |
| Long training field (LTF) | Long training field | Used for precise synchronization and preliminary channel estimation between two communication parties |
| Signal field (SIG) | Signal field | Parsed by a receiver to determine a transmission parameter |
| Service field | Service field | Include 16 zeros to initialize a data scrambler |
| Data field | Data field | Service data unit, which is a variable-length field |
| Tail field | Tail field | Tail bits required to terminate convolutional code, and for a single stream, this field uses six zeros |
| Padding field | Padding field | Variable-length field, used to ensure that a non-HT data field include an integer quantity of symbols |

Based on the radio frame format shown in FIG. 6(a), the STF may be used to carry the first sequence or the second sequence, or the LTF may be used to carry the first sequence or the second sequence. When the STF is used to carry the first sequence or the second sequence, the STF is used to perform rough synchronization between the two communication parties, and further indicates a transmission mode used for data carried in the radio frame. In other words, the STF further indicates that the data carried in the radio frame is important data or unimportant data. Correspondingly, when the LTF is used to carry the first sequence or the second sequence, the LTF is used by the two communication parties to perform precise synchronization and preliminary channel estimation, and further indicates a transmission mode corresponding to data carried in the radio frame. In other words, the LTF further indicates that the data carried in the radio frame is important data or unimportant data.

Figure 6B:
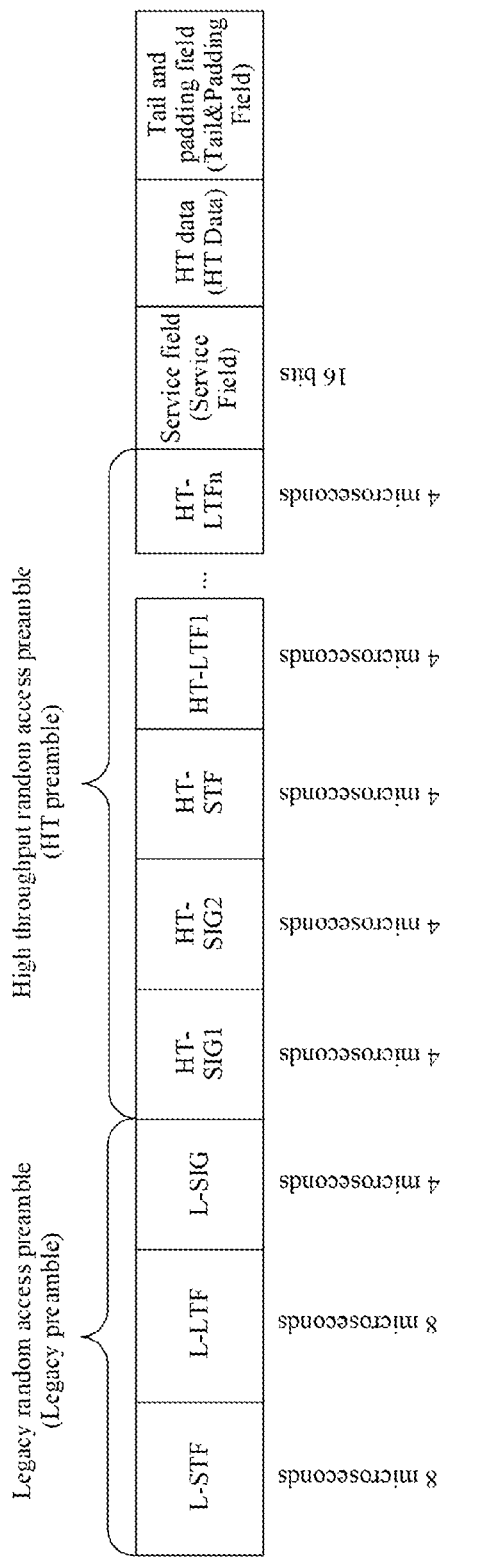
FIG. 6(b) is a schematic diagram of another format of a Wi-Fi radio frame.

FIG. 6(b) is a schematic diagram of another format of a Wi-Fi radio frame. The Wi-Fi radio frame is an HT mixed format PPDU. Meanings of fields in the HT mixed format PPDU are shown in Table 2.

TABLE 2

| PPDU field | English description | Function description |
| --- | --- | --- |
| Low-rate short training field (L-STF) | Non-HT short training field | Used for rough synchronization between two communication parties at a low rate |
| Low-rate long training field (L-LTF) | Non-HT long training field | Used for precise synchronization and preliminary channel estimation between two communication parties at a low rate |
| L-SIG (low-rate signal field) | Non-HT signal field | Parsed by a low-rate receiver to determine a transmission parameter |
| High-throughput signal field (HT-SIG) | HT signal field | Parsed by a high-rate receiver to determine a transmission parameter |
| High throughput short training field (HT-STF) | HT short training field | Used for rough synchronization between two communication parties at a high rate |
| High throughput long training field (HT-LTF) | HT long training field | Used for precise synchronization and preliminary channel estimation between two communication parties at a high rate |
| Service field | Service field | Include 16 zeros to initialize a data scrambler |
| High-throughput data (HT data) | HT data | Physical layer convergence protocol (PLCP) service data unit, which is a variable-length field |
| Tail field | Tail field | Tail bits required to terminate convolutional code, and for a single stream, this field uses six zeros |
| Padding field | Padding field | Variable-length field, used to ensure that a non-HT data field include an integer quantity of symbols |

Based on the radio frame format shown in FIG. 6(b), the L-STF may be used to carry the first sequence or the second sequence, or the L-LTF may be used to carry the first sequence or the second sequence. When the L-STF is used to carry the first sequence or the second sequence, the L-STF is used to perform rough synchronization between the two communication parties, and further indicates a transmission mode used for data carried in the radio frame. In other words, the L-STF further indicates that the data carried in the radio frame is important data or unimportant data. Correspondingly, when the L-LTF is used to carry the first sequence or the second sequence, the L-LTF is used by the two communication parties to perform precise synchronization and preliminary channel estimation, and further indicates a transmission mode corresponding to data carried in the radio frame. In other words, the L-LTF further indicates that the data carried in the radio frame is important data or unimportant data.

The first sequence and the second sequence are different. Optionally, the first sequence and the second sequence are reverse sequences.

An example in which the LTF in the radio frame format shown in FIG. 6(a) carries the first sequence or the second sequence is used. In an example, that the LTF carries the first sequence may be, for example:

$L_{-26,26}$={1, 1, −1, −1, 1, 1, −1, 1, −1, 1, 1, 1, 1, 1, 1, −1, −1, 1, 1, −1, 1, −1, 1, 1, 1, 0, 1, −1, −1, 1, 1, −1, 1, −1, 1, −1, −1, −1, −1, −1, 1, 1, −1, −1, 1, −1, 1, −1, 1, 1, 1, 1}.

That the LTF carries the second sequence may be, for example:

$L_{-26,26}$={−1, −1, 1, 1, −1, −1, 1, −1, 1, −1, −1, −1, −1, −1, 1, 1, −1, −1, 1, −1, 1, −1, −1, −1, −1, 0, −1, 1, 1, −1, −1, 1, −1, 1, 1, 1, 1, 1, −1, −1, 1, 1, −1, 1, −1, 1, 1, −1, −1, −1, −1}.

Step 502: If the radio frame carries the first sequence, decode the radio frame in a decoding mode corresponding to the HARQ transmission mode.

For specific description of the HARQ transmission mode, refer to related description in the embodiment corresponding to FIG. 2. For example, the decoding mode corresponding to the HARQ transmission mode may be turbo decoding.

The following describes the decoding mode corresponding to the HARQ transmission mode.

In the decoding mode corresponding to the HARQ transmission mode, there is one HARQ buffer in the receive device. The HARQ buffer is empty in an initial state, and the HARQ buffer is used to store an initially transmitted frame or a retransmitted frame that fails to be decoded by the receive device. Specifically, when the receive device receives a retransmitted frame of a radio frame, the receive device obtains, from the HARQ buffer, an initially transmitted frame or a retransmitted frame (if any) of the radio frame that fails to be decoded, and performs soft combination on the received retransmitted frame and the radio frame obtained from the HARQ buffer to implement joint decoding. This improves a decoding success rate.

The following describes, with reference to an example, the decoding mode corresponding to the HARQ transmission mode.

For to-be-sent important data, the transmit device stores, in a HARQ buffer of the transmit device, 10 different redundancy encoding versions after encoding the important data, which are respectively X1, X2, X3, X4, X5, X6, X7, X8, X9, and X10. A redundancy encoding version in a first transmission is X1. When retransmission is required, retransmission is performed in sequence of X2, X3, X4, X5, X6, X7, X8, X9, and X10, and after receiving a positive acknowledgment sent by the receive device, the transmit device stops sending another redundancy encoding version.

For example, a process in which the receive device receives the radio frame from the transmit device is as follows.

First time of receiving (initial transmission): The transmit device sends a radio frame 1 (carrying X1) to the receive device; the receive device receives the radio frame 1; and the receive device decodes X1. If failing to decode X1, the receive device stores X1 in the HARQ buffer, and sends a negative acknowledgment to the transmit device. In this case, the HARQ buffer of the receive device stores {X1}.

Second time of receiving (retransmission): The transmit device sends a radio frame 2 (carrying X2) to the receive device; the receive device receives the radio frame 2; and the receive device obtains X1 from the HARQ buffer, and performs soft combination and joint decoding on X1 and X2. If failing to perform joint decoding on X1 and X2, the receive device stores X2 in the HARQ buffer, and sends the negative acknowledgment to the transmit device. In this case, the HARQ buffer of the receive device stores {X1, X2}.

Third time of receiving (retransmission): The transmit device sends a radio frame 3 (carrying X3) to the receive device; the receive device receives the radio frame 3; and the receive device obtains X1 and X2 from the HARQ buffer, and performs soft combination and joint decoding on X1, X2, and X3. If failing to perform joint decoding on X1, X2, and X3, the receive device stores X3 in the HARQ buffer, and sends the negative acknowledgment to the transmit device. In this case, the HARQ buffer of the receive device stores {X1, X2, X3}.

Fourth time of receiving (retransmission): The transmit device sends a radio frame 4 (carrying X4) to the receive device; the receive device receives the radio frame 4; and the receive device obtains X1, X2, and X3 from the HARQ buffer, and performs soft combination and joint decoding on X1, X2, X3, and X4. If successfully performing joint decoding on X1, X2, X3, and X4, the receive device clears the HARQ buffer, and sends the positive acknowledgment to the transmit device. Then, the transmit device also clears the HARQ buffer of the transmit device.

Based on the foregoing decoding mode, because soft combination and joint decoding are performed on a plurality of different redundancy encoding versions, a decoding gain is obtained, and a decoding success rate can be improved. This ensures a sending success rate of important data.

Step 503: If the radio frame carries the second sequence, decode the radio frame in a decoding mode corresponding to the non-HARQ transmission mode.

For specific description of the non-HARQ transmission mode (which may be the first transmission mode or the second transmission mode), refer to related description in the embodiment corresponding to FIG. 2. The decoding mode corresponding to the non-HARQ transmission mode may be FEC decoding.

For the non-HARQ transmission mode, when a radio frame is decoded, only encoded data of the currently received radio frame is decoded each time, and joint decoding is not used as the decoding mode corresponding to the HARQ transmission mode. Therefore, a decoding speed is faster, but a decoding success rate is lower than a decoding success rate of the decoding mode corresponding to the HARQ transmission mode. For detailed description of the non-HARQ transmission mode, refer to the description of the non-HARQ transmission mode in the foregoing method embodiments on the transmit side. Details are not described herein again.

Based on the foregoing solution, data is transmitted in different transmission modes. For example, the important data may be transmitted in the HARQ transmission mode, and the unimportant data may be transmitted in the non-HARQ transmission mode. In this way, successful sending of the important data can be ensured, and data transmission quality is improved. In addition, the unimportant data is transmitted in the non-HARQ transmission mode, which can reduce transmission overheads compared with the HARQ transmission mode.

In an implementation, when the receive device needs to send the positive acknowledgment or the negative acknowledgment for the received radio frame to the transmit device, the receive device may select any one of the following methods 1 to 3 to send the positive acknowledgment or the negative acknowledgment to the transmit device.

Method 1: Send the positive acknowledgment or the negative acknowledgment to the transmit device by using a pre-scheduled time-frequency resource.

The pre-scheduled time-frequency resource may be a time-frequency resource that is pre-scheduled by an access device (for example, a base station, an access point (AC), or the like) and that is used to send the positive acknowledgment or the negative acknowledgment.

Method 2: The receive device sends the positive acknowledgment or the negative acknowledgment to the transmit device by using a first time-frequency resource, where the first time-frequency resource is a time-frequency resource occupied by the radio frame to be sent by the receive device to the transmit device.

That is, when the receive device needs to send the positive acknowledgment or the negative acknowledgment to the transmit device, the receive device also needs to send the radio frame to the transmit device. In this case, the receive device may add the positive acknowledgment or the negative acknowledgment to the radio frame, and send the radio frame to the transmit device. This method does not occupy extra overheads. For example, if a format of the radio frame to be sent by the receive device to the transmit device is shown in FIG. 6(a) or FIG. 6(b), the positive acknowledgment or the negative acknowledgment may be carried in the tail field or the padding field of the radio frame.

Method 3: The receive device sends the positive acknowledgment or the negative acknowledgment to the transmit device by using a re-applied time-frequency resource.

For example, the receive device may re-apply for the time-frequency resource from a base station or an access point to send the positive acknowledgment or the negative acknowledgment.

In another implementation, the receive device may alternatively preset priorities for the foregoing method 1 to method 3. For example, the priorities of the method 1, the method 2, and the method 3 decrease sequentially. In this case, the receive device may select, based on the priorities of the three methods, one method to send the positive acknowledgment or the negative acknowledgment to the transmit device. Specifically, if the method 1 can be used, the method 1 is used; if the method 1 cannot be used but the method 2 can be used, the method 2 is used; or if the method 1 and the method 2 cannot be used but the method 3 can be used, the method 3 is used.

It should be noted that, if none of the foregoing three methods can be used, the positive acknowledgment or the negative acknowledgment may not be sent, or the positive acknowledgment or the negative acknowledgment is sent after specified duration. This is not limited in this embodiment of this application.

It may be understood that, in the foregoing method embodiments, corresponding to a step or an operation implemented by the transmit device may alternatively be implemented by a component (for example, a chip or a circuit) configured in the transmit device, and corresponding to a step or an operation implemented by the receive device may alternatively be implemented by a component (for example, a chip or a circuit) configured in the receive device.

Figure 7A:
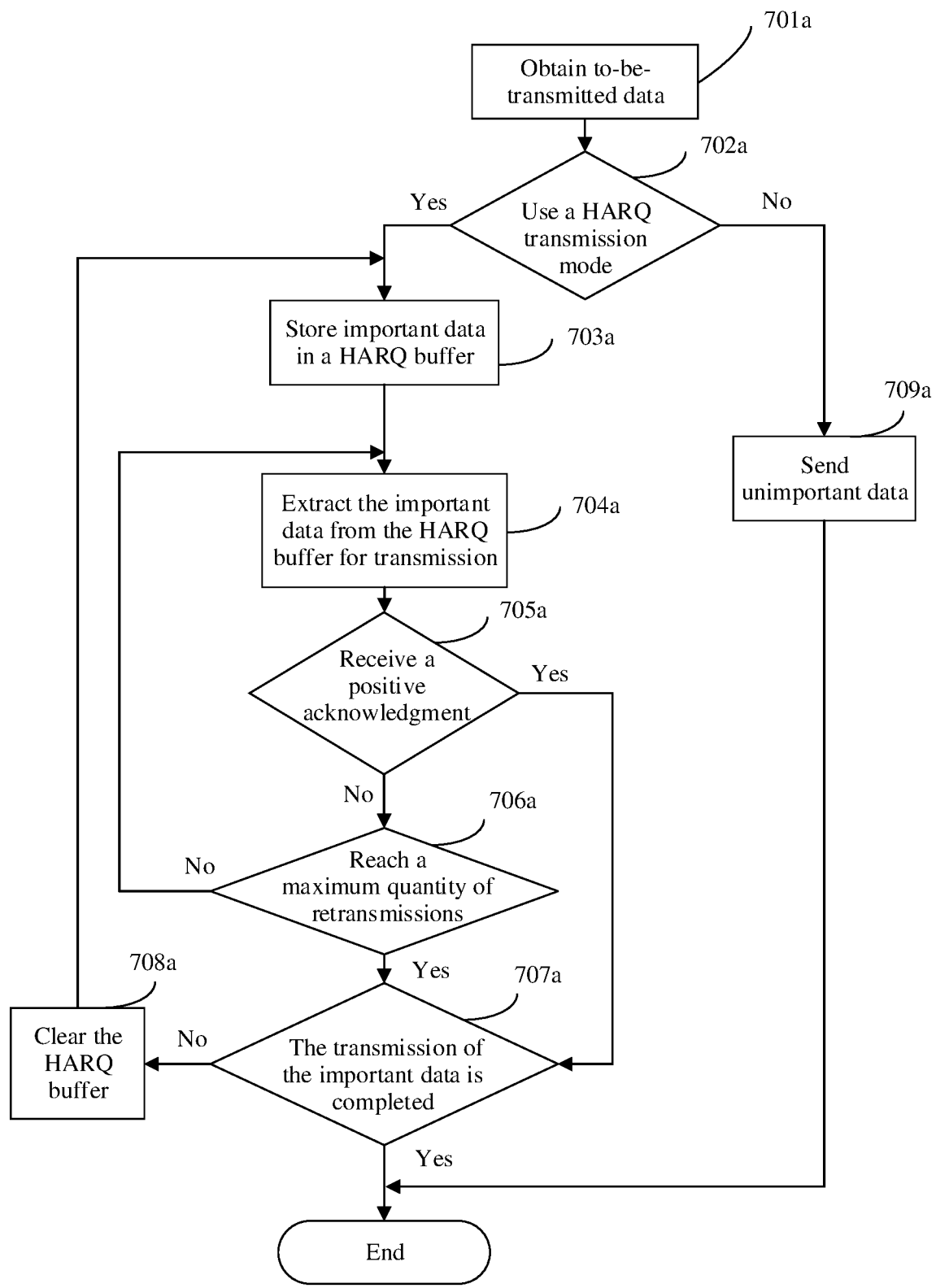
FIG. 7(a) is a schematic diagram of still another data transmission method according to an embodiment of this application.

The following describes the foregoing data transmission method on the transmit device side by using a complete flowchart. FIG. 7(a) is a schematic diagram of still another data transmission method according to an embodiment of this application. The method includes the following steps.

Step 701a: Obtain to-be-transmitted data.

The to-be-transmitted data is important data or unimportant data.

For example, a source end (for example, a data link layer) of a transmit device obtains a to-be-transmitted media data frame, and then classifies the media data frame into the important data and the unimportant data.

For the important data, when sending a data packet carrying the important data to a channel end (for example, a physical layer), the source end further adds first indication information to the data packet. The first indication information indicates that the data packet carries the important data. Therefore, the channel end may identify, based on the first indication information, that the data packet carries the important data.

For the unimportant data, when sending a data packet carrying the unimportant data to a channel end (for example, a physical layer), the source end further adds second indication information to the data packet. The second indication information indicates that the data packet carries the unimportant data. Therefore, the channel end may identify, based on the second indication information, that the data packet carries the unimportant data.

After step 701a, go to step 702a.

Step 702a: Determine whether a HARQ transmission mode is used.

After receiving the data packet from the source end of the transmit device, the channel end of the transmit device determines whether the data packet carries the important data or the unimportant data. If the data packet carries the first indication information, data in the data packet is the important data. If the data packet carries the second indication information, data in the data packet is the unimportant data.

If the data is the important data, the channel end sends the important data to the receive device in the HARQ transmission mode. That is, perform the following step 703a.

If the data is the unimportant data, the unimportant data is sent to the receive device in a first transmission mode or a second transmission mode. That is, perform the following step 709a.

It should be noted that, for a media data frame, after important data of the media data frame is successfully sent according to the method in step 703a to step 708a, unimportant data of the media data frame is sent according to the method in step 709a. Because the important data fails to be sent, the unimportant data is not sent.

The following step 703a to step 708a describe that the channel end of the transmit device sends the important data to the receive device in the HARQ transmission mode.

Step 703a: Store the important data in a HARQ buffer.

When determining to send the important data to the receive device in the HARQ transmission mode, the channel end of the transmit device may send, based on a current resource scheduling status, the important data to the receive device by using one or more first radio frames.

For example, if the to-be-transmitted important data is 1200 bytes, and a currently scheduled radio time-frequency resource may be used to transmit 200-byte data, the channel end of the transmit device may perform channel encoding (for example, perform turbo encoding) on first 200 bytes of the important data to obtain a plurality of different redundancy encoding versions of the 200-byte data, and store the plurality of different redundancy encoding versions in the HARQ buffer. A quantity of redundancy encoding versions may be preconfigured, and indicates a maximum quantity of retransmissions.

Subsequently, after the 200-byte data is successfully transmitted or the 200-byte data is still not successfully transmitted when the maximum quantity of retransmissions is reached, the channel end of the transmit device may clear the HARQ buffer, and continue to transmit a subsequent byte of data in the important data based on the currently scheduled radio time-frequency resource. For example, if the currently scheduled radio time-frequency resource may be used to transmit 400-byte data, the channel end of the transmit device may perform channel encoding on $201^{st}$ to $600^{th}$ bytes (400 bytes in total) of the important data to obtain a plurality of different redundancy encoding versions of the 400-byte data, and store the plurality of different redundancy encoding versions in the HARQ buffer.

After step 703a, go to step 704a.

Step 704a: Extract the important data from the HARQ buffer for transmission.

The channel end of the transmit device may extract the important data from the HARQ buffer for transmission. For example, the channel end of the transmit device may extract one of N different redundancy encoding versions from the HARQ buffer, perform transmission by using a channel at the physical layer, and send the extracted redundancy encoding version to the channel end of the receive device.

It should be noted that, after one of the N different redundancy encoding versions is extracted from the HARQ buffer, the extracted redundancy encoding version is no longer stored in the HARQ buffer.

In an implementation, if the HARQ buffer buffers the N different redundancy encoding versions in a form of a queue, the channel end of the transmit device may extract, from the HARQ buffer each time, a redundancy encoding version at a queue head for transmission. In still another implementation, if the HARQ buffer buffers the N different redundancy encoding versions in a form of a hash function, the channel end of the transmit device may extract, from the HARQ buffer each time, one redundancy encoding version according to a hash operation for transmission.

It should be noted that the transmit device adds the extracted redundancy encoding version to a radio frame (referred to as the first radio frame), and sends the radio frame to the receive device.

After step 704a, go to step 705a.

Step 705a: Determine whether a positive acknowledgment is received.

In the HARQ transmission mode, each time the transmit device sends a radio frame to the receive device, the transmit device receives feedback information that is sent by the receive device and that is for the radio frame. If the received feedback information is the positive acknowledgment (ACK), it indicates that data in the radio frame is successfully decoded. If the received feedback information is a negative acknowledgment (NACK), it indicates that data in the radio frame is not successfully decoded.

When the feedback information that is received by the transmit device from the receive device and that is for the first radio frame is the positive acknowledgment, the transmit device determines that the receive device successfully decodes the data in the first radio frame. Therefore, perform the following step 707a, that is, check whether transmission of the important data is completed. If the transmission is not completed, another part of data in the important data continues to be transmitted.

When the feedback information that is received by the transmit device from the receive device and that is for the first radio frame is the negative acknowledgment, the transmit device determines that the receive device fails to decode the data in the first radio frame. Therefore, perform the following step 706a, that is, attempt to retransmit the data.

Step 706a: Determine whether the maximum quantity of retransmissions is reached.

When the data needs to be retransmitted, the transmit device first needs to determine whether the maximum quantity of retransmissions is reached.

If the maximum quantity of retransmissions is reached, the data is no longer retransmitted, which indicates that the data transmission fails, that is, the receive device fails to decode the data. Therefore, perform step 707a, that is, check whether transmission of the important data is completed. If the transmission is not completed, another part of data in the important data continues to be transmitted.

If the maximum quantity of retransmissions is not reached, it indicates that retransmission can be performed currently. Therefore, perform step 704a, that is, extract the important data from the HARQ buffer for transmission. It should be noted that a redundancy encoding version corresponding to the important data fetched from the HARQ buffer this time is different from a redundancy encoding version fetched last time. That is, retransmitting the important data is retransmitting different redundancy encoding versions corresponding to the important data each time.

Based on the method, when the receive device fails to decode one redundancy encoding version corresponding to the received important data, the receive device may receive other redundancy encoding versions corresponding to the important data from the transmit device, and may further perform soft combination on the redundancy encoding versions to implement joint decoding. A decoding success rate can be improved, and therefore the HARQ transmission has a decoding gain.

It should be noted that an implementation for determining whether a quantity of retransmissions reaches the maximum quantity of retransmissions is not limited in this embodiment of this application.

In an example, a counter may be set to determine whether the quantity of retransmissions reaches the maximum quantity of retransmissions. For example, an initial value of the counter is 0. When a first radio frame is sent, before the first radio frame is sent, it is determined whether a value of the counter is less than the maximum quantity of retransmissions. If yes, a first radio frame (which may be initially transmitted or retransmitted) carrying a redundancy encoding version is sent, and then the value of the counter is increased by 1. If no, the first radio frame is not allowed to be sent.

In still another example, whether the maximum quantity of retransmissions is reached may alternatively be determined by determining whether there is still a remaining redundancy encoding version in the HARQ buffer. If yes, it indicates that the maximum quantity of retransmissions is not reached, and the data may be retransmitted. If no, it indicates that the maximum quantity of retransmissions is reached, and the data cannot be retransmitted.

Step 707a: Determine whether the transmission of the important data is completed.

Based on the description in step 703a, it can be learned that one piece of important data may be large, and therefore needs to be transmitted for a plurality of times. Therefore, after a part of data of the important data is transmitted, it needs to be determined whether the important data still has remaining data that needs to be transmitted.

When the transmit device determines that the transmission of the important data is completed, the procedure ends, indicating that the transmission of the important data ends.

When determining that the transmission of the important data is not completed, the transmit device performs step 708a, that is, clears the HARQ buffer.

Step 708a: Clear the HARQ buffer.

In an implementation, the transmit device first determines whether there is data stored in the HARQ buffer; and if there is data stored in the HARQ buffer, erases the HARQ buffer, or if there is no data stored in the HARQ buffer, does not perform any operation. In this method, a quantity of times of erasing the HARQ buffer can be reduced.

In another implementation, the transmit device does not determine whether there is data stored in the HARQ buffer, but directly erases the HARQ buffer to clear the HARQ buffer. In this method, whether there is data in the HARQ buffer does not need to be determined.

After step 708a, go to step 703a. It should be noted that when step 703a is performed next time, another part of the important data is targeted. For example, with reference to the foregoing example, one piece of important data has the 1200 bytes. When step 703a is performed for the first time, the first 200 bytes of the important data are encoded to obtain the plurality of different redundancy encoding versions, and the plurality of different redundancy encoding versions are stored in the HARQ buffer. When step 703a is performed for the second time, the $201^{st}$ to $600^{th}$ bytes (400 bytes in total) of the important data are encoded to obtain the plurality of different redundancy encoding versions, and the plurality of different redundancy encoding versions are stored in the HARQ buffer.

The following step 709a describes that the channel end of the transmit device sends the unimportant data to the receive device in a non-HARQ transmission mode (which may be specifically the first transmission mode or the second transmission mode).

Step 709a: Send the unimportant data.

For example, when the channel end of the transmit device determines that the to-be-transmitted data is the unimportant data, the transmit device sends, to the receive device in the non-HARQ transmission mode, at least one second radio frame corresponding to the unimportant data.

In an example, the non-HARQ transmission mode may be the first transmission mode, and the first transmission mode is a transmission mode without a retransmission mechanism. In still another example, the non-HARQ transmission mode may alternatively be the second transmission mode, and the second transmission mode is a transmission mode in which the retransmission mechanism exists and an FEC encoding version corresponding to a radio frame is retransmitted each time.

For specific description of the first transmission mode and the second transmission mode, refer to the description in the foregoing embodiments. Details are not described again.

According to the foregoing solution, it is implemented that at least one first radio frame corresponding to the important data is sent to the receive device in the HARQ transmission mode, and the at least one second radio frame corresponding to the unimportant data is sent to the receive device in the non-HARQ transmission mode.

To enable the receive device to identify whether a received radio frame (for example, the first radio frame or the second radio frame) uses the HARQ transmission mode, for example, the channel end of the transmit device may add a first sequence to the first radio frame, and add a second sequence to the second radio frame. The first sequence and the second sequence are different sequences. Optionally, the first sequence and the second sequence are reverse sequences. Therefore, after the receive device receives a radio frame from the transmit device, if determining that the radio frame carries the first sequence, the receive device determines that the radio frame is transmitted in the HARQ transmission mode; and if determining that the radio frame carries the second sequence, the receive device determines that the radio frame is transmitted in the non-HARQ transmission mode (which may be specifically the pre-agreed first transmission mode or the pre-agreed second transmission mode). For example, a manner in which the first radio frame carries the first sequence may be, for example, that the first radio frame includes a random access preamble, and the random access preamble carries the first sequence. When the random access preamble includes a long training field and a short training field, the first sequence may be carried in the long training field or the short training field. For example, a manner in which the second radio frame carries the second sequence may be, for example, that the second radio frame includes a random access preamble, and the random access preamble carries the second sequence. When the random access preamble includes a long training field and a short training field, the second sequence may be carried in the long training field or the short training field. For specific embodiments of the first sequence and the second sequence, refer to related description in the method embodiments on the receive side.

Based on the foregoing solution, the transmit device may use different sending modes based on whether to-be-sent data is the important data. Because the important data is more important for the receive device to restore original content (such as an image and audio), the HARQ transmission mode is used for transmission. This can improve a success rate of decoding the important data by the receive device. Because the unimportant data is less important for the receive device to restore original content (such as an image and audio), the non-HARQ transmission mode is used for transmission. This can reduce occupation of sending resources and improve a decoding speed without affecting restoration of the original content by the receive device. Freezing and frame losses can be reduced by using this solution, and data transmission reliability and an anti-interference capability can be improved. In this way, user experience is improved.

Figure 7B:
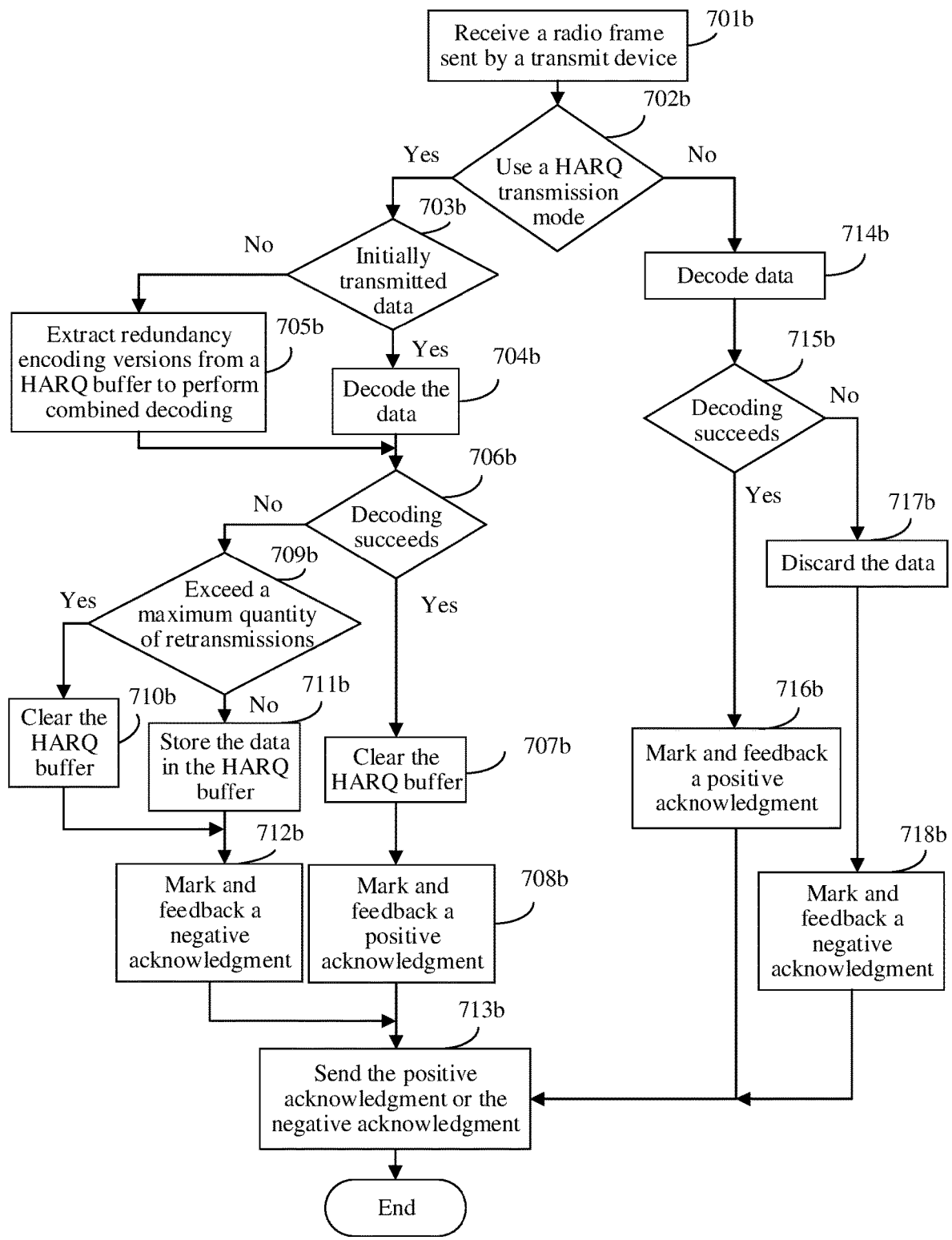
FIG. 7(b) is a schematic diagram of still another data transmission method according to an embodiment of this application.

The following describes the foregoing data transmission method on the receive device side by using a complete flowchart. FIG. 7(b) is a schematic diagram of still another data transmission method according to an embodiment of this application. The method includes the following steps.

Step 701b: Receive a radio frame sent by a transmit device.

Specifically, a channel end (that is, a physical layer) of a receive device may receive the radio frame from the transmit device. The received radio frame may be the first radio frame that is sent in the HARQ transmission mode, or may be the second radio frame that is described in the embodiment in FIG. 2 and that is sent in the non-HARQ transmission mode (that is, the pre-agreed first transmission mode or the pre-agreed second transmission mode).

Step 702b: Determine whether the HARQ transmission mode is used for the radio frame.

For example, the receive device may determine, based on whether the received radio frame carries a first sequence or a second sequence, whether the HARQ transmission mode is used for the radio frame. For example, when the received radio frame carries the first sequence, the receive device determines that the HARQ transmission mode is used for the radio frame. When the received radio frame carries the second sequence, the receive device determines that the non-HARQ transmission mode is used for the radio frame (that is, the pre-agreed first transmission mode or the pre-agreed second transmission mode).

It should be noted that when the HARQ transmission mode is used for the radio frame, it indicates that the radio frame carries important data. When the non-HARQ transmission mode is used for the radio frame, it indicates that the radio frame carries unimportant data.

For a specific implementation in which the radio frame carries the first sequence or the second sequence, refer to the foregoing description. Details are not described again.

In step 702b, if it is determined that the received radio frame is sent in the HARQ transmission mode, go to step 703b, that is, decode the radio frame (that is, decode the important data in the radio frame) in a decoding mode (for example, turbo decoding) corresponding to the HARQ transmission mode. If it is determined that the received radio frame is sent in the non-HARQ transmission mode, go to step 714b, that is, decode the radio frame (that is, decode the unimportant data in the radio frame) in a decoding mode (for example, FEC decoding) corresponding to the non-HARQ transmission mode.

The following step 703b to step 712b describe decoding the radio frame in the decoding mode corresponding to the HARQ transmission mode.

In the decoding mode corresponding to the HARQ transmission mode, there is one HARQ buffer in the receive device. The HARQ buffer is empty in an initial state, and the HARQ buffer is used to store initially transmitted data or retransmitted data that fails to be decoded by the receive device. When the receive device determines that the received radio frame is transmitted in the HARQ transmission mode, the receive device may decode the data in the radio frame based on the HARQ buffer. Specifically, when the receive device receives a retransmitted frame (the retransmitted frame carries retransmitted data), the receive device may obtain, from the HARQ buffer, initially transmitted data or retransmitted data (if any) that is corresponding to the important data and that fails to be decoded, and perform soft combination on the received retransmitted data and the data obtained from the HARQ buffer to implement decoding. This improves a decoding success rate. Details are described below.

Step 703b: Determine whether the data carried in the radio frame is the initially transmitted data.

If the data is the initially transmitted, go to step 704b.

If the data is not the initially transmitted data (that is, is the retransmitted data), go to step 705b.

Step 704b: Decode the data.

When the receive device determines that the initially transmitted data is received, the HARQ buffer is empty. Therefore, the receive device directly decodes the initially transmitted data. It should be noted that the initially transmitted data herein is one of a plurality of different redundancy encoding versions obtained by the transmit device by encoding to-be-transmitted data. For details, refer to related description of the transmit side.

After step 704b, go to step 706b.

Step 705b: Extract the redundancy encoding versions from the HARQ buffer to perform combined decoding.

Because the HARQ buffer is used to store data that fails to be decoded, when the received data is not the initially transmitted data (that is, is the retransmitted data), it indicates that data (which may be the initially transmitted data or the retransmitted data) received last time fails to be decoded and is stored in the HARQ buffer.

It should be noted that initially transmitted data or different retransmitted data of one piece of data received by the receive device is one of a plurality of redundancy encoding versions obtained after the transmit device encodes the data, and the plurality of redundancy encoding versions are different from each other.

When the redundancy encoding versions of the data are stored in the HARQ buffer, the redundancy encoding versions are extracted from the HARQ buffer, and then combined decoding (or referred to as joint decoding) is performed on the currently received redundancy encoding version and the redundancy encoding versions extracted from the HARQ buffer. Because combined decoding is performed based on a plurality of redundancy encoding versions, a decoding success rate can be improved, that is, compared with separate decoding of one encoding version of data, a decoding gain is obtained.

After step 705b, go to step 706b.

Step 706b: Determine whether the decoding succeeds.

After one piece of the initially transmitted data is decoded (that is, the foregoing step 704b) or one piece of the retransmitted data is decoded (that is, the foregoing step 705b), it needs to be determined whether the decoding succeeds.

If the decoding succeeds, go to step 707b.

If the decoding fails, go to step 709b.

Step 707b: Clear the HARQ buffer.

Because the receive device successfully decodes the received data (which may be successful decoding of the initially transmitted data or successful joint decoding of the retransmitted data), it indicates that a process of receiving the radio frame is completed. Therefore, a redundancy encoding version (if any) that is stored in the HARQ buffer and that fails to be decoded is no longer required, and the HARQ buffer may be cleared, so that the HARQ buffer may be used to receive a next radio frame.

A method for clearing the HARQ buffer by the receive device includes but is not limited to the following.

Method 1: The receive device first determines whether there is data stored in the HARQ buffer; and if there is data stored in the HARQ buffer, erases the HARQ buffer, or if there is no data stored in the HARQ buffer, does not perform any operation. In this method, a quantity of times of erasing the HARQ buffer can be reduced.

Method 2: The receive device does not determine whether there is data stored in the HARQ buffer, but directly erases the HARQ buffer to clear the HARQ buffer. In this method, whether there is data in the HARQ buffer does not need to be determined.

After step 707b, go to step 708b.

Step 708b: Mark and feed back a positive acknowledgment.

Because the receive device successfully decodes the data, the receive device needs to send feedback information to the transmit device, and the feedback information is the positive acknowledgment. Therefore, the receive device marks and feeds back the positive acknowledgment. In this way, a corresponding time-frequency resource can be subsequently scheduled to feed back the positive acknowledgment to the transmit device.

After step 708b, go to step 713b.

Step 709b: Determine whether a maximum quantity of retransmissions is reached.

The maximum quantity of retransmissions may be pre-configured.

In the foregoing step 706b, when it is determined that the received data (which may be the initially transmitted data or the retransmitted data) fails to be decoded, it needs to be determined whether a quantity of retransmissions of the data reaches the maximum quantity of retransmissions.

When the quantity of retransmissions reaches the maximum quantity of retransmissions, the receive device determines that the data fails to be received (that is, data content of the radio frame is not successfully decoded and obtained), and the data is not retransmitted subsequently. Go to step 710b.

When the quantity of retransmissions does not reach the maximum quantity of retransmissions, the receive device determines that the data is currently not successfully decoded and data content of the radio frame is not obtained, but the data is further retransmitted subsequently. Go to step 711b.

Step 710b: Clear the HARQ buffer.

Because the receive device fails to receive the data (that is, fails to decode and obtain the data content of the radio frame), and the maximum quantity of retransmissions is reached, the process of receiving the radio frame is completed. Therefore, data (if any) that is stored in the HARQ buffer and that fails to be decoded is no longer required, and the HARQ buffer may be cleared, so that the HARQ buffer can be used to receive next piece of data.

A method for clearing the HARQ buffer by the receive device is similar to the method for clearing the HARQ buffer in step 707b. Refer to the foregoing description.

After step 710b, go to step 712b.

Step 711b: Store the data in the HARQ buffer.

Because the receive device fails to decode latest received data (that is, a redundancy encoding version), but the data is further subsequently retransmitted, the receive device may store, in the HARQ buffer, the currently received redundancy encoding version that fails to be decoded. In this way, when retransmitted data (that is, another redundancy encoding version) of the data is received next time, joint decoding may be performed based on the redundancy encoding version that fails to be decoded in the HARQ buffer, to improve a decoding gain.

It should be noted that, for one piece of data, each time decoding fails, a different redundancy encoding version of the data is stored in the HARQ buffer. Therefore, when retransmitted data of the data is received next time, a quantity of redundancy encoding versions on which joint decoding can be performed is also increased by one. In this way, a decoding success rate can be improved. That is, a larger quantity of retransmissions indicates a higher decoding success rate.

After step 711b, go to step 712b.

Step 712b: Mark and feed back a negative acknowledgment.

Because the receive device fails to decode the data, the receive device needs to send feedback information to the transmit device, and the feedback information is the negative acknowledgment. Therefore, the receive device marks and feeds back the negative acknowledgment. In this way, a corresponding time-frequency resource can be subsequently scheduled to feed back the negative acknowledgment to the transmit device.

After step 712b, go to step 713b.

Step 713b: Send the positive acknowledgment or the negative acknowledgment.

If step 708b is performed in the foregoing process, the receive device sends the positive acknowledgment to the transmit device to indicate that the decoding succeeds. If step 712b is performed in the foregoing process, the receive device sends the negative acknowledgment to the transmit device to indicate that the decoding fails.

For a specific implementation in which the receive device sends the positive acknowledgment or the negative acknowledgment to the transmit device, refer to related description in the embodiment corresponding to FIG. 5. Details are not described herein again.

The following step 714b to step 718b describe decoding (for example, FEC decoding) performed on the data carried in the radio frame in the decoding mode corresponding to the non-HARQ transmission mode.

In a specific implementation, the non-HARQ transmission mode may be the first transmission mode or the second transmission mode. For description of the two transmission modes, refer to related description in the foregoing embodiment. In an actual application, the transmit device and the receive device may agree in advance on one of the two transmission modes for transmission.

Step 714b: Decode the data.

When the transmit device sends the radio frame to the receive device in the first transmission mode, after receiving the radio frame, the receive device performs decoding only based on the data carried in the radio frame, and does not perform joint decoding like decoding corresponding to the HARQ transmission mode.

When the transmit device sends the radio frame to the receive device in the second transmission mode, after receiving the radio frame, the receive device also performs decoding only based on the data carried in the radio frame, and does not perform joint decoding like decoding corresponding to the HARQ transmission mode.

After step 714b, go to step 715b.

Step 715b: Determine whether the decoding succeeds.

For the first transmission mode, when the receive device successfully performs decoding, the procedure ends; or when the receive device fails to perform decoding, go to step 717b, that is, discard the data. Because each piece of data is transmitted for only one time in the first transmission mode, regardless of whether the receive device successfully decodes the data, the transmit device does not retransmit the data. Therefore, when the receive device fails to decode the data, the receive device discards the data. This indicates that the data is not successfully obtained.

For the second transmission mode, when the receive device successfully performs decoding, the procedure ends; or when the receive device fails to perform decoding, go to step 717b, that is, discard the data. Because retransmission is also performed in the second transmission mode, and FEC encoding is performed on data retransmitted each time, the retransmitted data is the same, which is different from the HARQ transmission, where different redundancy encoding versions of same data are retransmitted each time. Therefore, unlike the HARQ transmission, joint encoding cannot be performed in the second transmission mode. In this way, when failing to decode the received data, the receive device discards the data. This indicates that the data is not successfully obtained.

After step 715b, go to step 716b.

Step 716b: Mark and feed back a positive acknowledgment.

Because the receive device successfully decodes the radio frame, the receive device needs to send feedback information to the transmit device, and the feedback information is the positive acknowledgment. Therefore, the receive device marks and feeds back the positive acknowledgment. In this way, a corresponding time-frequency resource can be subsequently scheduled to feed back the positive acknowledgment to the transmit device.

After step 716b, go to step 713b.

Step 717b: Discard the data.

After the receive device discards the data, go to step 718b.

Step 718b: Mark and feed back a negative acknowledgment.

Because the receive device fails to decode the data, the receive device needs to send feedback information to the transmit device, and the feedback information is the negative acknowledgment. Therefore, the receive device marks and feeds back the negative acknowledgment. In this way, a corresponding time-frequency resource can be subsequently scheduled to feed back the negative acknowledgment to the transmit device.

After step 718b, go to step 713b.

Based on the method in step 715b to step 718b, when the data received by the receive device is sent in the non-HARQ transmission mode, it indicates that the data is not the important data. Therefore, after parsing fails, the data is directly discarded without being stored for joint decoding.

Based on the foregoing solution, the transmit device may use different sending modes based on whether to-be-sent data is the important data. Because the important data is more important for the receive device to restore original content (such as an image and audio), the HARQ transmission mode is used for transmission. This can improve a success rate of decoding the important data by the receive device. Because the unimportant data is less important for the receive device to restore original content (such as an image and audio), the non-HARQ transmission mode is used for transmission. This can reduce occupation of sending resources and improve a decoding speed without affecting restoration of the original content by the receive device. Freezing and frame losses can be reduced by using this solution, and data transmission reliability and an anti-interference capability can be improved. In this way, user experience is improved.

Figure 8:
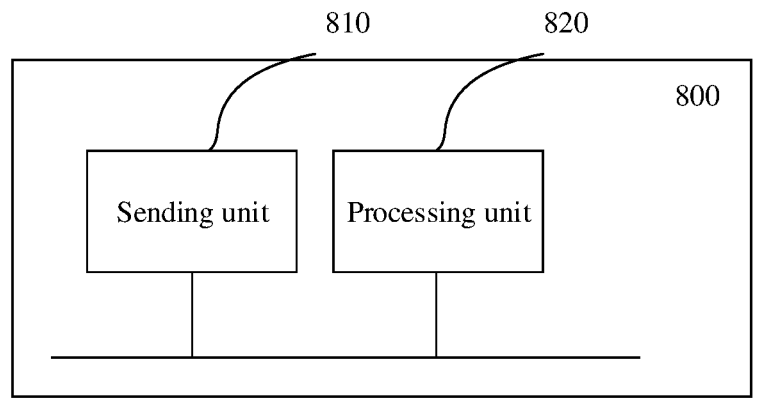
FIG. 8 is a schematic diagram of a transmit device according to an embodiment of this application.

FIG. 8 is a schematic diagram of a transmit device according to an embodiment of this application. The device is configured to implement the steps in the foregoing embodiment in FIG. 2. As shown in FIG. 8, the transmit device 800 includes a sending unit 810 and a processing unit 820.

The sending unit 810 is configured to: send important data of a media data frame to a receive device in a HARQ transmission mode, where the important data of the media data frame includes a basic part of the media data frame; and after the important data of the media data frame is successfully sent, send unimportant data of the media data frame to the receive device in a non-HARQ transmission mode, where the unimportant data of the media data frame includes an enhanced part of the media data frame.

In a possible implementation, the important data of the media data frame further includes an encoding parameter corresponding to the media data frame.

In a possible implementation, duration occupied for sending the important data of the media data frame does not exceed a length of a first sending time window, and the length of the first sending time window is maximum duration allowed for sending the important data of the media data frame and the unimportant data of the media data frame.

In a possible implementation, that the sending unit 810 is configured to send important data of a media data frame to a receive device in a HARQ transmission mode specifically includes: sending the important data of the media data frame within the first sending time window in the HARQ transmission mode. That the sending unit 810 is configured to: after the important data of the media data frame is successfully sent, send unimportant data of the media data frame to the receive device in a non-HARQ transmission mode specifically includes: after the important data of the media data frame is successfully sent, sending the unimportant data in remaining duration of the first sending time window, where the remaining duration is remaining time after the important data of the media data frame is successfully sent within the first sending time window.

In a possible implementation, the processing unit 820 is configured to: if the important data of the media data frame is successfully sent within the first sending time window, but remaining duration of the first sending time window is not enough for sending the unimportant data of the media data frame, determine to stop sending of the unimportant data of the media data frame to the receive device, where the remaining duration is remaining time after the important data of the media data frame is successfully sent within the first sending time window.

In a possible implementation, the processing unit 820 is configured to: if the important data of the media data frame is not successfully sent within the first sending time window, determine to stop sending the important data of the media data frame to the receive device, and determine to stop sending the unimportant data of the media data frame to the receive device.

In a possible implementation, the non-HARQ transmission mode is a first transmission mode, and the first transmission mode is a transmission mode without a retransmission mechanism.

In a possible implementation, the non-HARQ transmission mode is a second transmission mode, and the second transmission mode is a transmission mode in which the retransmission mechanism exists and forward error correction FEC encoding version data corresponding to the unimportant data is retransmitted each time.

In a possible implementation, a maximum quantity of retransmissions corresponding to the second transmission mode is less than a maximum quantity of retransmissions corresponding to the HARQ transmission mode.

In a possible implementation, that the sending unit 810 is configured to send important data of a media data frame to a receive device in a HARQ transmission mode specifically includes: sending, to the receive device in the HARQ transmission mode, at least one first radio frame corresponding to the important data of the media data frame, where the at least one first radio frame carries a first sequence, and the first sequence indicates that the at least one first radio frame is sent in the HARQ transmission mode. That the sending unit 810 is configured to send unimportant data of the media data frame to the receive device in a non-HARQ transmission mode specifically includes: sending, to the receive device in the non-HARQ transmission mode, at least one second radio frame corresponding to the unimportant data, where the at least one second radio frame carries a second sequence, and the second sequence indicates that the at least one second radio frame is sent in the non-HARQ transmission mode. The first sequence and the second sequence are different sequences.

In a possible implementation, the first sequence and the second sequence are reverse sequences.

In a possible implementation, a frame format of the first radio frame is the same as a frame format of the second radio frame, and the frame format includes a long training field and a short training field. The long training field of the at least one first radio frame carries the first sequence, and the long training field of the second radio frame carries the second sequence; or the short training field of the at least one first radio frame carries the first sequence, and the short training field of the second radio frame carries the second sequence.

In a possible implementation, the frame format is a non-high throughput format non-HT format PPDU format or a high throughput mixed format HT mixed format.

Optionally, the transmit device 800 may further include a storage unit. The storage unit is configured to store data or instructions (which may also be referred to as code or a program). The foregoing units may interact with or be coupled to the storage unit to implement a corresponding method or function. For example, the processing unit 820 may read the data or the instructions in the storage unit to enable the transmit device to implement the methods in the foregoing embodiments.

It should be further understood that division of units in the transmit device is merely logical function division. During actual implementation, all or some of the units may be integrated into one physical entity or may be physically separated. In addition, all the units in the transmit device may be implemented in a form in which a processing element invokes software, or may be implemented in a form of hardware; or some units may be implemented in a form of software invoked by a processing element, and some units may be implemented in a form of hardware. For example, the units may be separately disposed processing elements, or may be integrated into a chip of the transmit device for implementation. In addition, the units may be stored in a memory in a program form, and are invoked by a processing element of the transmit device to perform functions of the units. In addition, all or a part of these units may be integrated together, or may be implemented independently. The processing element herein may also be referred to as a processor, and may be an integrated circuit having a signal processing capability. During implementation, steps in the foregoing methods or the foregoing units may be implemented by using a hardware integrated logic circuit in a processing element, or may be implemented in the form in which the processing element invokes software.

In an example, a unit in any one of the foregoing transmit devices may be one or more integrated circuits configured to implement the foregoing methods, for example, one or more application-specific integrated circuits (ASIC), one or more microprocessors (DSP), one or more field programmable gate arrays (FPGA), or a combination of at least two of these integrated circuits. For another example, when the units in the transmit device may be implemented in a form in which a processing element schedules a program, the processing element may be a general purpose processor, for example, a central processing unit (CPU) or another processor that can invoke the program. For another example, the units may be integrated together and implemented in a form of a system-on-a-chip (SOC).

Figure 9:
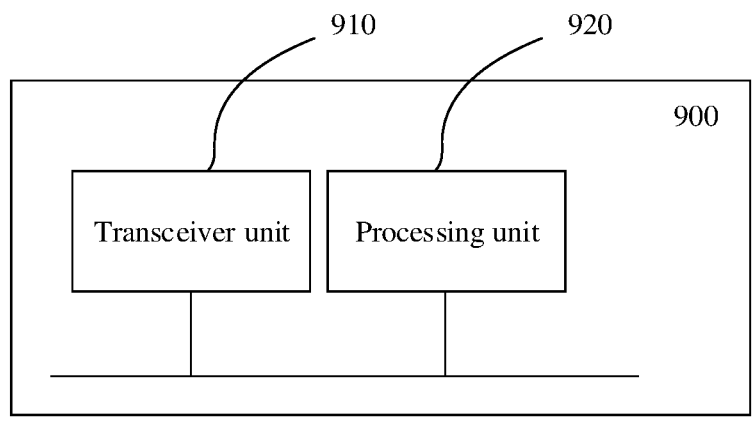
FIG. 9 is a schematic diagram of a receive device according to an embodiment of this application.

FIG. 9 is a schematic diagram of a receive device according to an embodiment of this application. The device is configured to implement the steps in the foregoing embodiment in FIG. 5. As shown in FIG. 9, the receive device 900 includes a transceiver unit 910 and a processing unit 920.

The transceiver unit 910 is configured to receive a radio frame from a transmit device. The processing unit 930 is configured to: if the radio frame carries a first sequence, decode the radio frame in a decoding mode corresponding to a hybrid automatic repeat request HARQ transmission mode, or if the radio frame carries a second sequence, decode the radio frame in a decoding mode corresponding to a non-HARQ transmission mode. The second sequence is different from the first sequence.

In a possible implementation, the decoding mode corresponding to the HARQ transmission mode is turbo decoding.

In a possible implementation, the decoding mode corresponding to the non-HARQ transmission mode is forward error correction FEC decoding.

In a possible implementation, the non-HARQ transmission mode is a first transmission mode, and the first transmission mode is a transmission mode without a retransmission mechanism.

In a possible implementation, the non-HARQ transmission mode is a second transmission mode, and the second transmission mode is a transmission mode in which the retransmission mechanism exists and forward error correction FEC encoding version data corresponding to the unimportant data is retransmitted each time.

In a possible implementation, a maximum quantity of retransmissions corresponding to the second transmission mode is less than a maximum quantity of retransmissions corresponding to the HARQ transmission mode.

In a possible implementation, the first sequence and the second sequence are reverse sequences.

In a possible implementation, a frame format of the radio frame includes a long training field and a short training field. The long training field of the radio frame carries the first sequence or the second sequence; or the short training field of the radio frame carries the first sequence or the second sequence.

In a possible implementation, the frame format is a non-high throughput format non-HT format PPDU format or a high throughput mixed format HT mixed format.

In a possible implementation, the transceiver unit 910 is configured to: send feedback information for the radio frame to the transmit device by using a pre-scheduled time-frequency resource, where the feedback information is a positive acknowledgment or a negative acknowledgment; send feedback information to the transmit device by using a first time-frequency resource, where the first time-frequency resource is a time-frequency resource occupied by the radio frame to be sent to the transmit device; or send feedback information to the transmit device by using a re-applied time-frequency resource.

In a possible implementation, the transceiver unit 910 is configured to: send the feedback information for the radio frame to the transmit device by preferentially using the pre-scheduled time-frequency resource; if the pre-scheduled time-frequency resource cannot be used, send the feedback information to the transmit device by preferentially using the first time-frequency resource; or if neither the pre-scheduled time-frequency resource nor the first time-frequency resource can be used, send the feedback information to the transmit device by using the re-applied time-frequency resource.

Optionally, the receive device 900 may further include a storage unit. The storage unit is configured to store data or instructions (which may also be referred to as code or a program). The foregoing units may interact with or be coupled to the storage unit to implement a corresponding method or function. For example, the processing unit 920 may read the data or the instructions in the storage unit to enable the receive device to implement the methods in the foregoing embodiments.

It should be further understood that division of units in the receive device is merely logical function division. During actual implementation, all or some of the units may be integrated into one physical entity or may be physically separated. In addition, all the units in the receive device may be implemented in a form in which a processing element invokes software, or may be implemented in a form of hardware; or some units may be implemented in a form of software invoked by a processing element, and some units may be implemented in a form of hardware. For example, the units may be separately disposed processing elements, or may be integrated into a chip of the receive device for implementation. In addition, the units may be stored in a memory in a program form, and are invoked by a processing element of the receive device to perform functions of the units. In addition, all or a part of these units may be integrated together, or may be implemented independently. The processing element herein may also be referred to as a processor, and may be an integrated circuit having a signal processing capability. During implementation, steps in the foregoing methods or the foregoing units may be implemented by using a hardware integrated logic circuit in a processing element, or may be implemented in the form in which the processing element invokes software.

In an example, a unit in any one of the foregoing receive devices may be one or more integrated circuits configured to implement the foregoing methods, for example, one or more ASICs, one or more DSPs, one or more FPGAs, or a combination of at least two of the integrated circuit forms. For another example, when the units in the receive device may be implemented in a form in which a processing element schedules a program, the processing element may be a general-purpose processor, for example, a CPU or another processor that can invoke the program. For another example, the units may be integrated and implemented in a form of a SoC.

Figure 10:
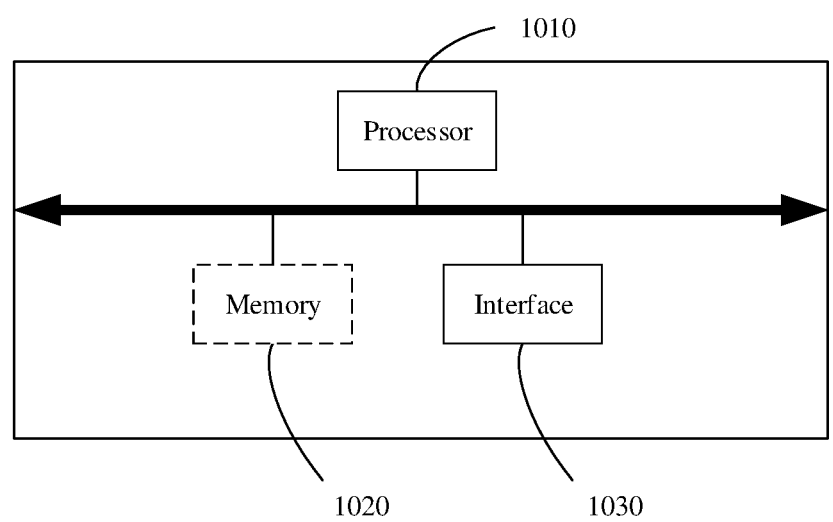
FIG. 10 is a schematic diagram of a communication apparatus according to an embodiment of this application.

FIG. 10 is a schematic diagram of a communication apparatus according to an embodiment of this application. The communication apparatus is configured to implement operations of the transmit device or the receive device in the foregoing embodiments. As shown in FIG. 10, the communication apparatus includes a processor 1010 and an interface 1030. Optionally, the communication apparatus further includes a memory 1020. The interface 1030 is configured to communicate with another device.

The method performed by the transmit device or the receive device in the foregoing embodiments may be implemented by the processor 1010 by invoking a program stored in a memory (which may be the memory 1020 in the transmit device or the receive device, or may be an external memory). That is, the transmit device or the receive device may include the processor 1010, and the processor 1010 invokes the program in the memory to perform the method performed by the transmit device or the receive device in the foregoing method embodiments. The processor herein may be an integrated circuit having a signal processing capability, for example, a CPU. The transmit device or the receive device may be implemented by using one or more integrated circuits configured to implement the foregoing method, for example, one or more ASICs, one or more microprocessors DSPs, one or more FPGAs, or a combination of at least two of the integrated circuit forms. Alternatively, the foregoing implementations may be combined.

Specifically, functions/implementation processes of the sending unit 810 and the processing unit 820 in FIG. 8 may be implemented by the processor 1010 in the communication apparatus 1000 shown in FIG. 10 by invoking computer-executable instructions stored in the memory 1020. Alternatively, functions/implementation processes of the processing unit 820 in FIG. 8 may be implemented by the processor 1010 in the communication apparatus 1000 shown in FIG. 10 by invoking computer-executable instructions stored in the memory 1020, and functions/implementation processes of the sending unit 810 in FIG. 8 may be implemented through the interface 1030 in the communication apparatus 1000 shown in FIG. 10, for example, the function/implementation process of the sending unit 810 may be implemented by the processor by invoking program instructions in the memory to drive the interface 1030.

Specifically, functions/implementation processes of the transceiver unit 910 and the processing unit 920 in FIG. 9 may be implemented by the processor 1010 in the communication apparatus 1000 shown in FIG. 10 by invoking computer-executable instructions stored in the memory 1020. Alternatively, functions/implementation processes of the processing unit 920 in FIG. 9 may be implemented by the processor 1010 in the communication apparatus 1000 shown in FIG. 10 by invoking computer-executable instructions stored in the memory 1020, and functions/implementation processes of the transceiver unit 910 in FIG. 9 may be implemented through the interface 1030 in the communication apparatus 1000 shown in FIG. 10. The function/implementation process of the transceiver unit 910 may be implemented by the processor by invoking program instructions in the memory to drive the interface 1030.

A person of ordinary skill in the art may understand that various numbers such as first and second in this application are merely used for differentiation for ease of description, and are not used to limit the scope of embodiments of this application or represent a sequence. The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects. "At least one" means one or more. At least two means two or more. "At least one", "any one", or a similar expression thereof indicates any combination of the items, and includes a singular item (piece) or any combination of plural items (pieces). For example, at least one of a, b, or c may indicate: a, b, c, a and b, a and c, b and c, or a, b, and c, where a, b, and c may be singular or plural. The term "a plurality of" means two or more, and another quantifier is similar to this.

It should be understood that sequence numbers of the foregoing processes do not mean execution sequences in various embodiments of this application. The execution sequences of the processes should be determined according to functions and internal logic of the processes, and should not be construed as any limitation on the implementation processes of embodiments of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

All or some of foregoing embodiments may be implemented by using software, hardware, firmware, or any combination thereof. When the software is used to implement embodiments, all or a part of embodiments may be implemented in a form of a computer program product. The computer program product includes one or more computer instructions. When the computer program instructions are loaded and executed on the computer, the procedures or functions according to embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

The various illustrative logical units and circuits in embodiments of this application may implement or operate the functions via a general-purpose processor, a digital signal processor, an application-specific integrated circuit (ASIC), a field programmable gate array (FPGA) or another programmable logical apparatus, a discrete gate or transistor logic, a discrete hardware component, or a design of any combination thereof. The general-purpose processor may be a microprocessor. Optionally, the general-purpose processor may also be any conventional processor, controller, microcontroller, or state machine. The processor may also be implemented by a combination of computing apparatuses, such as a digital signal processor and a microprocessor, a plurality of microprocessors, one or more microprocessors with a digital signal processor core, or any other similar configuration.

Steps of the methods or algorithms described in embodiments of this application may be directly embedded into hardware, a software unit executed by a processor, or a combination thereof. The software unit may be stored in a random access memory (RAM), a flash memory, a read-only memory (ROM), an EPROM, an EEPROM, a register, a hard disk, a removable magnetic disk, a CD-ROM, or a storage medium of any other form in the art. For example, the storage medium may connect to a processor, so that the processor may read information from the storage medium and write information to the storage medium. Alternatively, the storage medium may be integrated into a processor. The processor and the storage medium may be disposed in the ASIC.

These computer program instructions may also be loaded onto a computer or another programmable data processing device, so that a series of operations and steps are performed on the computer or the another programmable device to generate computer-implemented processing. Therefore, the instructions executed on the computer or the another programmable device provide steps for implementing a specific function in one or more processes in the flowcharts and/or in one or more blocks in the block diagrams.

In one or more exemplary designs, the functions described in this application may be implemented by using hardware, software, firmware, or any combination thereof. If the functions are implemented by using software, the functions may be stored in a computer-readable medium, or are transmitted to the computer-readable medium in a form of one or more instructions or code. The computer-readable medium is either a computer storage medium or a communication medium that enables a computer program to move from one place to another. The storage medium may be an available medium that may be accessed by any general-purpose or special-purpose computer. For example, such a computer-readable medium may include but is not limited to a RAM, a ROM, an EEPROM, a CD-ROM, or another optical disc storage, a disk storage or another magnetic storage apparatus, or any other medium that may be used to bear or store program code, where the program code is in a form of instructions or a data structure or in a form that can be read by a general-purpose or special-purpose computer or a general-purpose or special-purpose processor. In addition, any connection may be appropriately defined as a computer-readable medium. For example, if software is transmitted from a website, a server, or another remote resource by using a coaxial cable, an optical fiber computer, a twisted pair, a digital subscriber line (DSL) or in a wireless manner, such as infrared, radio, or microwave, the software is included in a defined computer-readable medium. The disk and the disc include a compact disc, a laser disc, an optical disc, a digital versatile disc (DVD), a floppy disk, and a Blu-ray disc. The disc usually copies data in a magnetic manner, and the disk usually optically copies data in a laser manner. The foregoing combination may also be included in the computer-readable medium.

A person skilled in the art should be aware that in the foregoing one or more examples, functions described in this application may be implemented by hardware, software, firmware, or any combination thereof. When the functions are implemented by software, the foregoing functions may be stored in a computer-readable medium or transmitted as one or more instructions or code in a computer-readable medium. The computer-readable medium includes a computer storage medium and a communication medium. The communication medium includes any medium that enables a computer program to be transmitted from one place to another. The storage medium may be any available medium accessible to a general-purpose or special-purpose computer.

In the foregoing specific implementations, the objectives, technical solutions, and beneficial effects of this application are further described in detail. It should be understood that the foregoing description is merely a specific implementation of this application, but is not intended to limit the protection scope of this application. Any modification, equivalent replacement, improvement, or the like made based on the technical solutions of this application shall fall within the protection scope of this application. According to the foregoing description of this specification in this application, technologies in the art may use or implement the content of this application. Any modification based on the disclosed content shall be considered obvious in the art. The basic principles described in this application may be applied to other variations without departing from the essence and scope of this application. Therefore, the content disclosed in this application is not limited to the described embodiments and designs but may also be extended to a maximum scope that is consistent with the principles and disclosed new features of this application.

Although this application is described with reference to specific features and embodiments thereof, it is clearly that various modifications and combinations may be made to them without departing from the spirit and scope of this application. Correspondingly, the specification and accompanying drawings are merely example description of this application defined by the appended claims, and are considered as any of and all modifications, variations, combinations or equivalents that cover the scope of this application. It is clear that a person skilled in the art can make various modifications and variations to this application without departing from the scope of this application. This application is intended to cover these modifications and variations of this application provided that they fall within the scope of the claims of this application and their equivalent technologies.

What is claimed is:

1. A method comprising:
   sending first data, of a media data frame, that comprises key information of the media data frame to a device in a hybrid automatic repeat request (HARQ) transmission mode, wherein a duration for sending the first data of the media data frame is less than or equal to a length of a first sending time window, and the length of the first sending time window is a maximum duration allowed for sending the first data of the media data frame and second data of the media data frame;
   receiving a positive acknowledgement packet from the device indicating that the first data was successfully sent; and
   after the first data, of the media data frame, is successfully sent within the first sending time window, sending the second data, of the media data frame, to the device in another transmission mode that is different than the HARQ transmission mode within a remaining duration of the first sending time window, wherein the second data is data of the media data frame other than the key information.

2. The method according to claim 1, wherein the first data of the media data frame further comprises an encoding parameter corresponding to the media data frame.

3. The method according to claim 1, wherein the method further comprises:
   when the first data, of the media data frame, is successfully sent within the first sending time window:
      determining whether the remaining duration of the first sending time window is less than duration for sending the second data of the media data frame; and
      based on determining that the remaining duration of the first sending time window is less than the duration for sending the second data of the media data frame, stopping sending the second data of the media data frame to the device, wherein the remaining duration is remaining time after the first data of the media data frame is successfully sent within the first sending time window.

4. The method according to claim 1, wherein the method further comprises:
   when the first data of the media data frame is unsuccessfully sent within the first sending time window, stopping sending the first data of the media data frame to the device, and stopping sending the second data of the media data frame to the device.

5. The method according to claim 1, wherein the other transmission mode is a first transmission mode, and the first transmission mode is a transmission mode without a retransmission mechanism.

6. The method according to claim 1, wherein the other transmission mode is a second transmission mode, and the second transmission mode is a transmission mode with a retransmission mechanism that uses forward error correction (FEC) encoding on the second data that is retransmitted.

7. The method according to claim 6, wherein a maximum quantity of retransmissions corresponding to the second transmission mode is less than a maximum quantity of retransmissions corresponding to the HARQ transmission mode.

8. The method according to claim 1, wherein sending the first data, of the media data frame, to the device in the HARQ transmission mode comprises:
sending, to the device in the HARQ transmission mode, at least one first radio frame corresponding to the first data, of the media data frame, wherein the at least one first radio frame carries a first sequence, and the first sequence indicates that the at least one first radio frame is sent in the HARQ transmission mode; and
wherein sending the second data of the media data frame to the device in the other transmission mode that is different from the HARQ transmission mode comprises:
sending, to the device in the other transmission mode, at least one second radio frame corresponding to the second data, wherein the at least one second radio frame carries a second sequence, and the second sequence indicates that the at least one second radio frame is sent in the other transmission mode, wherein the first sequence and the second sequence are different sequences.

9. The method according to claim 8, wherein the first sequence and the second sequence are reverse sequences.

10. The method according to claim 8, wherein a frame format of the first radio frame is the same as a frame format of the second radio frame, and the frame format of the first radio frame and the frame format of the second radio frame each comprise a long training field and a short training field, wherein:
the long training field of the at least one first radio frame carries the first sequence, and the long training field of the second radio frame carries the second sequence; or
the short training field of the at least one first radio frame carries the first sequence, and the short training field of the second radio frame carries the second sequence.

11. The method according to claim 10, wherein the frame format of the first radio frame or the frame format of the second radio frame is a non-high throughput format (non-HT format) PPDU format or a high throughput mixed format (HT mixed format).

12. A method comprising:
receiving a radio frame, from a device, that includes a long training field (LTF) and a short training field (STF); and
when the radio frame carries a first sequence in the LTF or the STE, decoding the radio frame in a decoding mode corresponding to a hybrid automatic repeat request (HARQ) transmission mode, or
when the radio frame carries a second sequence in the LTF or the STE, decoding the radio frame in a decoding mode corresponding to another transmission mode that is different than the HARQ transmission mode, wherein the second sequence is different from the first sequence.

13. The method according to claim 12, wherein the decoding mode corresponding to the HARQ transmission mode is turbo decoding.

14. The method according to claim 12, wherein the decoding mode corresponding to the other transmission mode is forward error correction (FEC) decoding.

15. The method according to claim 12, wherein the other transmission mode is a first transmission mode, and the first transmission mode is a transmission mode without a retransmission mechanism.

16. The method according to claim 12, wherein the other transmission mode is a second transmission mode, and the second transmission mode is a transmission mode with a retransmission mechanism that uses forward error correction (FEC) encoding corresponding to data comprised in the radio frame.

17. The method according to claim 16, wherein a maximum quantity of retransmissions corresponding to the second transmission mode is less than a maximum quantity of retransmissions corresponding to the HARQ transmission mode.

18. A first device, comprising at least one processor, a non-transitory memory storing instructions, and a transmission interface, wherein the at least one processor is configured to execute the instructions stored in a non-transitory memory to cause the first device to perform operations, the operations comprising:
sending, using the transmission interface, first data, of a media data frame, that comprises key information of the media data frame to a second device in a hybrid automatic repeat request (HARQ) transmission mode, wherein a duration for sending the first data of the media data frame is less than or equal to a length of a first sending time window, and the length of the first sending time window is a maximum duration allowed for sending the first data of the media data frame and second data of the media data frame;
receiving, using the transmission interface, a positive acknowledgement packet from the second device indicating that the first data was successfully sent; and
after the first data, of the media data frame, is successfully sent, sending, using the transmission interface, the second data, of the media data frame, to the second device in another transmission mode that is different than the HARQ transmission mode within a remaining duration of the first sending time window, wherein the second data is data of the media data frame other than the key information.

19. The first device according to claim 18, wherein the first data of the media data frame further comprises an encoding parameter corresponding to the media data frame.

20. The first device according to claim 18, wherein the operations further comprise:
when the first data of the media data frame is unsuccessfully sent within the first sending time window, stopping sending the first data of the media data frame to the second device, and stopping sending the second data of the media data frame to the second device.

* * * * *